United States Patent [19]
Divan et al.

[11] Patent Number: 6,118,676
[45] Date of Patent: Sep. 12, 2000

[54] DYNAMIC VOLTAGE SAG CORRECTION

[75] Inventors: Deepakraj M. Divan; Glen Luckjiff, both of Madison; Robert Schneider, Middleton; William E. Brumsickle; William R. Kranz, both of Madison, all of Wis.

[73] Assignee: Soft Switching Technologies Corp., Middleton, Wis.

[21] Appl. No.: 09/433,993

[22] Filed: Nov. 4, 1999

Related U.S. Application Data

[60] Provisional application No. 60/107,872, Nov. 6, 1998.

[51] Int. Cl.[7] .................................. H02J 3/00; G05F 1/70
[52] U.S. Cl. ............................................. 363/34; 323/207
[58] Field of Search ................................ 363/16, 17, 34, 363/36, 37, 39, 40, 97, 98, 131, 132; 323/207–210, 237, 246; 318/375, 376, 459, 478, 479

[56] References Cited

U.S. PATENT DOCUMENTS

| | | | |
|---|---|---|---|
| 5,099,410 | 3/1992 | Divan | 363/98 |
| 5,329,222 | 7/1994 | Gyugyi et al. | 323/207 |
| 5,483,140 | 1/1996 | Hess et al. | 318/802 |
| 5,610,501 | 3/1997 | Nelson et al. | 323/207 |
| 5,852,558 | 12/1998 | Julian et al. | 363/132 |
| 5,969,957 | 10/1999 | Divan et al. | 363/36 |
| 6,005,362 | 1/1996 | Enjeti et al. | 318/479 |

*Primary Examiner*—Matthew Nguyen
*Attorney, Agent, or Firm*—Foley & Lardner

[57] ABSTRACT

A low cost, small size, light weight, and highly effective system and method for providing dynamic power line voltage sag correction is provided. A dynamic voltage sag corrector includes a static bypass switch and a regulator/storage module connected together in parallel between input terminals and output terminals. Under normal operating conditions, the static bypass switch is closed, and a normal line voltage level is provided directly from the input terminals to the output terminals via the static bypass switch. When a voltage sag condition is indicated, the static bypass switch is opened, and the regulator/storage module is controlled to provide a near normal output voltage signal to the output terminals. The regulator/storage module includes a power conversion circuit which is controlled to provide the desired output voltage signal by adding a voltage level on storage capacitors to the available input line voltage signal. The components of the dynamic voltage sag corrector are selected to provide voltage sag correction for a duration sufficient to provide correction of 90–95% of voltage sag/drop conditions which are likely to be encountered. The size, cost, and weight of the dynamic voltage sag corrector is thereby reduced. The dynamic voltage sag corrector may also provide surge condition correction, may be configured to provide extended duration voltage sag correction to a priority portion of a load, may provide support to a load even if there is a complete break in an input power line, and may be employed in single or multi-phase applications.

64 Claims, 10 Drawing Sheets

DYNAMIC VOLTAGE SAG CORRECTION

This application claims the benefit of U.S. Provisional Application No. 60/107,872, filed on Nov. 6, 1998.

FIELD OF THE INVENTION

This invention pertains generally to the field of electric power supplies and electric power conversion systems, and more particularly to systems for providing power line conditioning and for correcting voltage sag and drop conditions in a power line providing electric power to a load.

BACKGROUND OF THE INVENTION

A variety of power conversion circuits have been developed for converting electric power at one voltage level or frequency to another voltage level or frequency. A commonly used device for providing an output voltage signal to a load at a different level than that of the available input voltage signal is a step-up or a step-down transformer, which may be provided either on the input or output side of a power conversion circuit. Such transformers are relatively large, heavy, and expensive. If a power conversion circuit is intended to maintain an output voltage at a desired level despite variations in the input voltage level (or to allow the output voltage to be adjusted to a desired level at a constant input voltage level) more complex transformer structures may be required. For example, some power conditioning circuits utilize tap-changing transformers, in which the primary transformer winding includes a number of separate taps which are connected to the power conditioning circuit input terminals by static switches. A controller circuit monitors the power conditioning circuit output voltage and switches the proper static switches on the input side to maintain approximately the desired voltage level on the output side. Tap changing transformers, however, require many switching devices, such as thyristors, and only permit coarse control of the output voltage. Furthermore, distortion of the voltage on a load cannot be well controlled using such a transformer.

Another type of line conditioning circuit structure utilizes a ferroresonant transformer. The ferroresonant transformer is connected in a circuit which provides passive compensation for short term changes in an input voltage level. Ferroresonant transformers are widely used, and provide reasonable voltage regulation, typically plus or minus 4% at the transformer output for a minus 20% to plus 10% change in the transformer input voltage. However, output distortion can be sensitive to load input harmonics, and the input currents drawn may have undesirable power factors and distortion levels when ferroresonant transformers are employed for voltage regulation.

Power conditioning circuits employing tap changing or ferroresonant transformers are limited in application by the presence of the low frequency transformer, which must be able to handle full rated power. For example, for a one kilovolt ampere (KVA) line conditioner employing such a transformer, the transformer by itself can weigh over 30 to 40 pounds, and is the major component determining the size of the cabinet containing the power conditioning apparatus.

Voltage boosting circuits for increasing an available AC input voltage level to a desired AC output voltage level without employing a tap changing or ferroresonant transformer have been developed. Such circuits typically require that the input AC voltage signal be fully converted to a DC voltage level on a DC bus. The DC voltage is then inverted to AC power utilizing a full bridge inverter circuit. Such systems typically require an inverter employing four switching devices to provide a single phase AC output voltage signal and an inverter employing six switching devices to provide a three phase AC output voltage signal.

U.S. Pat. No. 5,099,410, to Deepakraj M. Divan, describes a power conversion circuit which converts an AC source voltage at one voltage level to an AC output voltage at a different voltage level without using a transformer and with a minimum number of solid state switching devices employed. The basic power conversion circuit described in this patent includes a pair of rectifying devices connected together at a first node, a pair of capacitors connected together at a second node, and a pair of controllable switching devices connected together at a third node, with the pairs of rectifying devices, capacitors, and switching devices connected in parallel by DC bus lines. The three nodes serve as three terminals of the power conversion circuit. The first terminal or node is common to both the input power source and the load, the second node or terminal is connected to the source, and the third node or terminal is connected to the load. With the load connected between the first and third terminals and the source connected between the first and second terminals, the power conversion circuit can be controlled by a system controller to provide a peak-to-peak output voltage to the load which is substantially double the peak-to-peak input voltage. The rectifying devices charge the capacitors to the peak of the input voltage. To obtain effective voltage doubling, the system controller provides turn-on and turn-off signals to the controllable switching devices alternately and in phase with the input voltage so that the voltage across one of the charged capacitors plus the input voltage is applied to the load during one half cycle of the input voltage waveform and the voltage across the other charged capacitor and the input voltage of the opposite polarity is applied to the load during the other half of the input voltage waveform. With a low pass filter connected to filter high frequency switching components from the output voltage signal provided to the load, to thereby provide a substantially sinusoidal waveform, the circuit can be controlled to provide an output voltage signal across the load that can be varied from substantially zero to substantially twice the peak-to-peak input voltage. To obtain less than complete voltage doubling of the output voltage provided across the load, the switching devices are switched on for a duty cycle which is less than a full half cycle of the input voltage waveform. For example, pulse width modulation may be utilized in controlling the switching devices so that a desired effective AC voltage level is provided across the load. Only two switching devices are required to obtain such operation.

A common application for the various power conversion systems just described is to provide power line conditioning. Power line conditioning systems are used to provide compensation for and correction of voltage sags and drops in the signal provided on power lines to a load. Industrial process disruptions due to poor electrical power quality cause billions of dollars per year in lost productivity in the United States alone. Deep voltage sags and momentary voltage interruptions have been called the most important power quality concerns affecting most industrial and commercial electrical power customers. Productivity losses can occur, for example, when momentary electrical power interruptions cause factory robots to "lockup", resulting in entire production lines stopping and a significant amount of scrapped product. As another example, a momentary interruption of electrical power for as little as one cycle can cause high intensity discharge (HID) lighting to restart, resulting in a delay of as much as 20 minutes before factory lighting can be restored. The Computer Business Equipment Manufacturers Association (CBEMA) guidelines indicate that a short duration voltage sag to 75% of nominal for as little as 0.03 seconds can cause the malfunction of equipment.

Power line conditions which can result in productivity losses vary from long term power outages to short duration voltage sags. However, voltage transients and momentary power interruptions, due to events such as lighting strikes, and line under-voltages (voltage sags) down to no less than 45–50% of nominal voltage, due to faults on the utility power system, account for the vast majority, 90–95%, of all utility power quality related events in the United States. Momentary voltage interruptions typically last no more than three cycles, and voltage sags typically last 0.05–2 seconds. Such conditions are cleared rapidly as the utility finds a new route to source the power. Actual power outages that last more than two seconds are a very rare event in the United States and other developed countries.

Various solutions to the power quality problems encountered by utility customers are currently in use. For example, surge suppressors are employed to provide load voltage protection for very short duration voltage transients caused, e.g., by lighting strikes. Surge suppressors are very inexpensive, but provide no compensation for voltage sags or extended power outages. Relatively low cost voltage regulators, typically employing tap changing transformers, have been used to provide voltage sag compensation. Such voltage regulators are much more expensive than surge suppressors, and are only of limited effectiveness in responding to voltage transients, due to the slow response of such systems. The slow response of tap changing systems also limits their ability to provide correction of voltage sags. As discussed previously, a voltage sag lasting less than one cycle may cause an industrial system disruption. Moreover, low cost voltage regulators employing tap changing transformers are typically only available for the correction of voltage sags to no lower than 80% of nominal voltage levels. Such systems provide no protection for larger voltage sags or complete power outages. Higher cost voltage regulators, employing constant voltage ferroresonant transformers, have faster response times, and thus should be capable of providing correction for transient events. However, systems employing such constant voltage transformers typically only provide effective power line conditioning for voltage sags to no less than 70% of nominal voltage levels. Such systems do not provide any power correction for larger voltage sags or extended power outages. Additionally, power conditioning systems employing constant voltage transformers are much more expensive than systems employing tap changing transformers, and are also much more heavy and bulky.

Uninterruptible power supplies (UPS) have also been used to provide correction of power line voltage transients, sags, and drops. The typical UPS includes at least a battery and an inverter. When a power line voltage drop is detected, the power line is disconnected from the load, and the UPS inverter is turned on to provide AC power to the load from the battery until a normal voltage level is restored on the power line. The system battery is recharged by a rectifier, or by controlling the inverter to operate as a rectifier, with power from the power line when normal power line voltage is restored. A UPS can typically respond quickly to power line transients, voltage sags, and voltage drops, and can provide power to a load from the battery for several minutes, if necessary, in response to an extended power line outage. UPS systems are, however, relatively very expensive. Such systems typically employ many expensive power switching devices which are rated to operate to provide power to a load for an extended duration without interruption. The UPS battery is also typically very expensive, heavy, and bulky, and must be replaced periodically.

The prior art thus fails to provide a lightweight compact inexpensive power conditioning system with a rapid response time for providing correction of the vast majority of power line conditions which can cause productivity losses.

SUMMARY OF THE INVENTION

The present invention provides a low cost, small size, lightweight, and highly effective system and method for providing dynamic power line voltage sag correction. A dynamic voltage sag corrector in accordance with the present invention provides correction of the most common power quality related events which may affect the operation of a load provided with electrical power on power lines from a utility power source. A dynamic voltage sag corrector in accordance with the present invention is connected to power lines between an unprotected utility power source and a load to provide a protected voltage output to the load. The dynamic voltage sag corrector includes a static bypass switch and a regulator/storage module connected together in parallel. Under normal power line conditions, the static bypass switch is closed, and a normal input line voltage signal is provided directly to the load. During such normal conditions, storage capacitors in the regulator/storage module are passively charged. When an input line voltage sag is detected, the dynamic voltage sag corrector static bypass switch is opened, and inverter switching devices in the regulator/storage module are controlled to provide power to the load to compensate for the voltage sag. In accordance with the present invention, the regulator/storage module provides power to the load from both the available input line voltage and the storage capacitors, to provide an output voltage signal to the load at a pre-voltage sag voltage level until the input voltage level is restored to the pre-fault level. In accordance with the present invention, the circuit components used in the regulator/storage module are selected such that the dynamic voltage sag corrector is capable of providing compensation for input voltage transients, sags, and drops for a duration of several seconds. Thus, a dynamic voltage sag corrector in accordance with the present invention provides correction for the vast majority of utility power quality related events encountered, with reduced component size, weight, and cost.

A dynamic voltage sag corrector in accordance with the present invention includes a static bypass switch, which may be implemented using conventional power switching devices, such as thyristors connected in anti-parallel, to conduct in opposite directions. The regulator/storage module is connected in parallel with the static bypass switch. In accordance with the present invention, the regulator/storage module includes a pair of rectifying devices, e.g., diodes, connected together at a first node, a pair of storage capacitors connected together at second node, and a pair of controllable inverter switching devices, e.g., transistors, connected together at a third node, with the pairs of rectifying devices, storage capacitors, and inverter switching devices connected in parallel by DC bus lines. The three nodes serve as three terminals of the regulator/storage module. The first terminal or node is common to both the input power source and the load, the second node or terminal is connected to the input power source, and the third node or terminal is connected to the load. A low-pass filter is preferably connected between the third node or terminal and the load.

Under normal power line operating conditions, the dynamic voltage sag corrector operates in the bypass mode. As long as the input line voltage remains at more than a selected percentage of the nominal input voltage level, the static bypass switch remains closed, and power is provided directly from the input line to the load via the static bypass switch, bypassing the regulator/storage module. During such normal operation, the storage capacitors in the regulator/storage module are each charged to near the peak voltage of the normal input voltage signal.

The dynamic voltage sag corrector is controlled by a system controller, which may be implemented using a microprocessor, discrete components, or a combination thereof. The input voltage and/or the output voltage provided to the load is monitored by the system controller. If a sag in the voltage provided to the load below a selected percentage of the nominal output voltage level is detected, the system controller opens the static bypass switch to interrupt the direct path from the input line to the load. The inverter switching devices in the regulator/storage module are then controlled by the system controller to boost the available incoming line voltage to a boosted output voltage level which is provided to the load. To obtain the desired voltage boost effect, the system controller provides turn-on and turn-off signals to the controllable inverter switching devices alternately such that the voltage across one of the charged storage capacitors plus the available input voltage is provided to the load during one portion of the input voltage waveform and such that the voltage across the other charged storage capacitor and the available input voltage of the opposite polarity is applied to the load during other portions of the input voltage waveform. The inverter switching devices are typically switched on for a duty cycle which is less than a full half cycle of the input voltage waveform. For example, pulse width modulation may be utilized in controlling the inverter switching devices to provide the desired AC voltage signal to the load. A low-pass filter removes high frequency switching components from the inverter output signal, to provide a nearly sinusoidal signal to the load.

A dynamic voltage sag corrector in accordance with the present invention preferably includes several safety features to protect the circuit from damage due to extreme operating conditions. For example, the current through the inverter switching devices in the regulator/storage module is preferably monitored by the system controller. If the inverter switching device current exceeds a safe operating value for the switching devices, the system controller turns the inverter switching devices off, and closes the static bypass switch to reconnect the load directly to the unprotected input voltage signal. The load current is preferably also monitored by the system controller during normal power line operation, when the load is being provided power directly from the input line via the static bypass switch. If the load current during normal operation exceeds the capability of the inverter switching devices in the regulator/storage module, operation of the regulator/storage module to provide sag correction is inhibited, to protect the inverter switching devices in the regulator/storage module from overload.

The preferred regulator/storage module circuit topology employed in a dynamic voltage sag corrector in accordance with the present invention may be operated as a voltage doubler for an indefinite period of time. Thus, a dynamic voltage sag corrector in accordance with the present invention is capable of restoring an input voltage sag to 45% of the nominal input voltage level to an output voltage level of 90% of the nominal input voltage level for an indefinite period. For voltage sags and complete input voltage interruptions below this level, the duration for which the regulator/storage module can restore the output voltage to a near normal level is limited by the energy stored in the storage capacitors in the regulator/storage module. Thus, the ability of the system to provide dynamic voltage sag correction for extreme voltage sags and complete voltage drops can be enhanced by increasing the size of the storage capacitors in the regulator/storage module. This, however, will increase the cost, size, and weight of the system. An alternative approach is to control the regulator/storage module to provide power only to a priority load portion of an entire load under such extreme voltage sag/voltage drop conditions. The priority load may represent a critical subset of the entire load supplied through the dynamic voltage sag corrector. During normal power line operation, the entire load is provided power from an input line through the static bypass switch. For voltage sags down to approximately 50% of the nominal input voltage level, the entire load is provided with power via the regulator/storage module, which is capable of compensating for such voltage sags indefinitely. For voltage sags and input voltage drops below approximately 50% of the nominal input voltage level, the regulator/storage module is connected only to provide power to the priority portion of the load, the balance of the load is disconnected from the regulator/storage module. In this manner, the regulator/storage module is able to support the priority load from the energy stored in the storage capacitors for a longer duration than the regulator/storage module could support the entire load. The priority load may thus be provided with power for a sufficient duration to effect an orderly shutdown.

A dynamic voltage sag corrector in accordance with the present invention may be configured to compensate for voltage surges as well as voltage sags. Voltage surges are relatively rare short-lived occurrences which can, nevertheless, interrupt the operation of or damage a load. In accordance with the present invention, the system controller of the dynamic voltage sag corrector may monitor the input line voltage level and/or the voltage level provided to a load for a voltage surge condition, e.g., a condition where the input line voltage exceeds a certain percentage greater than 100% of the nominal input voltage level. If a voltage surge is detected, the system controller opens the static bypass switch, and the load is provided with power at the nominal voltage level by operation of the regulator/storage module until the nominal input line voltage level is restored. Excess energy from the voltage surge, resulting from the high voltage level provided to the regulator/storage module from the input line in excess of the voltage level provided by the regulator/storage module to the load on the output line, will be stored in the regulator/storage module storage capacitors. An energy dissipation circuit, which may be implemented as a dissipation resistor connected in series with a dissipation switching device across the DC bus lines of the regulator/storage module, may be provided in the regulator/storage module and controlled by the system controller to dissipate the excess energy stored in the storage capacitors as a result of the voltage surge condition.

A dynamic voltage sag corrector in accordance with the present invention may be implemented for single phase or multiphase applications. For example, a three phase dynamic voltage sag corrector in accordance with the present invention may be implemented using three single phase sag correctors, one such single phase corrector provided for each phase. Cross-coupling between the three singlephase sag correctors may be provided to handle deeper single-line faults. Alternatively, a three phase dynamic voltage sag corrector in accordance with the present invention may be implemented using a regulator/storage module which is implemented using a single three-phase four leg inverter having a single pair of storage capacitors connected across DC bus lines thereof, or three single-phase full bridge inverters connected in parallel with a storage capacitor across DC bus lines. The storage capacitor(s) may be charged via a multiphase rectifier connected across the three phase input lines between the three phase input lines and the DC bus lines of the regulator/storage module. The three-phase outputs of the three phase inverter are coupled to the three-phase power lines via a transformer to inject a voltage boosting signal in series with the available three-phase input power to restore the voltage level provided to the load under voltage sag conditions to at or near the normal level.

A switching device may preferably be connected across the DC bus lines between the rectifier and the storage capacitor(s), with a diode connected in series with the DC bus line between the switch and the storage capacitor. If a fault or open circuit breaker causes a complete interruption in the current provided to the load on the three-phase input power lines, the switch connected in parallel with the multiphase rectifier may be closed, thereby providing an effective short circuit on the input line side of the transformer, allowing current flow through the transformer so that power can be delivered from the inverter through the transformer to the three-phase power lines and, therefore, to a load. This switch may also be controlled to operate as a boost converter, to charge the storage capacitor(s) to a level higher than the available input line-to-line voltage level, or to interface a high capacity energy storage device, such as an ultra capacitor, to the inverter.

A dynamic voltage sag corrector in accordance with the present invention provides a very low cost solution to the vast majority of power quality problems encountered by industrial, commercial, and residential power users. A dynamic voltage sag corrector provides surge suppression, protects against voltage sags, and provides ride through for short power outages. Thus, a dynamic voltage sag corrector corrects for all power quality problems except for extended power outages, which occur very rarely in the United States and other industrialized nations. All of these features are achieved, in accordance with the present invention, by a dynamic voltage sag corrector which may be made for a fraction of the cost, and which is a fraction of the size and weight, of competitive solutions.

The cost, size, and weight advantages of a dynamic voltage sag corrector in accordance with the present invention are achieved by selecting the operating characteristics of the sag corrector to maximize the ability of the corrector to protect a load from the vast majority of voltage surge, sag, and drop conditions which are likely to be encountered, while minimizing the rating of the circuit components which are required to provide such operating characteristics. The circuit components required to provide desired dynamic voltage sag correction operating characteristics are selected based on the thermal rating characteristics of the components. Unlike some other power conversion systems used for voltage sag compensation, such as double conversion uninterruptible power supplies, the inverter switching devices employed in the regulator/storage module of a dynamic voltage sag corrector in accordance with the present invention are not in operation most of the time, when normal input power is provided directly to a load via the static bypass switch. Thus, when a voltage sag condition occurs, requiring operation of the inverter switching devices to provide power to the load, the inverter switching devices are activated from a cold state. Inverter switching devices having a smaller power rating can thus be selected, since switching devices of a given rating can be operated from a cold state for a longer duration then from a warm state. Furthermore, although a dynamic voltage sag corrector in accordance with the present invention may provide compensation for a voltage sag to approximately 50% of the nominal input voltage level continuously, most voltage sags only last for a limited period of time, e.g., 1–2 seconds. With this in mind, the voltage rating of the inverter switching devices employed in the dynamic voltage sag corrector can be reduced further, by limiting the operating time of the inverter to the duration of 90–95% of all voltage sag conditions which will be encountered. Designing the dynamic voltage sag corrector circuit for short term voltage sags and outages (1–2 seconds) significantly reduces the cost and size of the circuit components which must be employed. Longer term voltage sag and drop events are rare, and typically do not occur continuously.

The operating duration for which a dynamic voltage sag corrector of a given rating can provide correction for a voltage sag or drop condition may be extended when the circuit component temperatures are lower. In accordance with an alternative embodiment of the present invention, the temperatures or operating time of selected components in the dynamic voltage sag corrector may be monitored by the system controller. Such monitored components may typically include, for example, the inverter switching devices in the regulator/storage module. If the monitored component temperatures are greater than a selected temperature level, or have just been operated, operation of the inverter may be limited to a short duration. Longer operation of the inverter may be allowed if the component temperatures are less than the selected temperature level or if the components have not been operated recently.

Further objects, features, and advantages of the present invention will be apparent from the following detailed description taken in conjunction with the accompanying drawings.

DETAILED DESCRIPTION OF THE INVENTION

Figure 1:
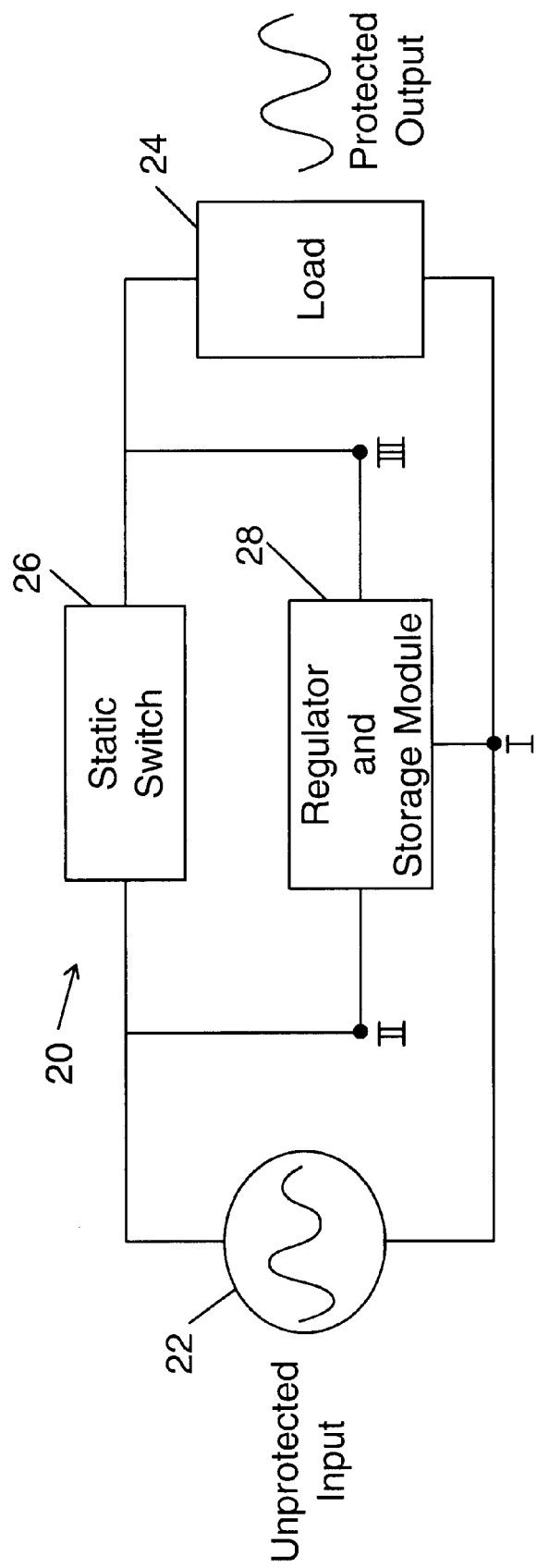
FIG. 1 is a schematic block diagram of a dynamic voltage sag corrector in accordance with the present invention.

A dynamic voltage sag corrector 20 in accordance with the present invention is illustrated in schematic block diagram form in, and will be described with reference to, FIG. 1. A dynamic voltage sag corrector 20 in accordance with the present invention is adapted to be connected between an AC power source 22 and an AC load 24. As will be described in more detail below, a dynamic voltage sag corrector 20 in accordance with the present invention may be employed to provide voltage sag correction for single or multiple phase voltage sources 22 and loads 24, and can be configured to provide protected power to a load 24 from an unprotected voltage source 22 at any voltage or power level. The two main components of a dynamic voltage sag corrector 20 in accordance with the present invention are a static bypass switch 26 and a regulator/storage module 28. The regulator/storage module 28 includes a system controller (not shown in FIG. 1) for monitoring the voltage level provided by the voltage source 22 to the load 24 and for controlling the static bypass switch 26 and the regulator/storage module 28. Under normal operating conditions, when the power source 22 is providing a normal power signal (e.g., within 10% of the nominal AC input voltage level), the static bypass switch 26 is closed, and power is provided directly from the source 22 to the load 24 via the static bypass switch 26. When the system controller in the regulator/storage module 28 detects a drop of the input voltage level provided by the source 22 by more than an acceptable amount, the system controller closes the static bypass switch 26 and controls the regulator/storage module 28 to provide AC power at or near the nominal voltage level to the load from the regulator/storage module 28. As will be described in more detail below, the regulator/storage module 28 is configured such that energy stored in the storage module 28 during normal operating conditions is added to available power from the voltage source 22 during a voltage sag condition. Thus, a dynamic voltage sag corrector 20 in accordance with the present invention is capable of providing voltage sag compensation for a duration sufficient to provide correction of the vast majority of voltage sag conditions likely to occur, without requiring the use of large energy storage devices. Furthermore, the circuit components in the regulator/storage module are selected such that the regulator/storage module 28 is capable of providing a protected output voltage signal to the load 24 for the vast majority of source voltage sags and drops which will be encountered, but not for rarely occurring extended power outages, to thereby provide a dynamic voltage sag corrector of significantly reduced size, weight, and cost A more detailed schematic circuit diagram of an exemplary dynamic voltage sag corrector 20 in accordance with the present invention is presented in, and will be described with reference to, FIG. 2. The exemplary dynamic voltage sag corrector 20 is adapted to be connected at input terminals 30 and 31 to a source of AC input voltage $V_{ACIN}$ and at output terminals 32 and 33 to a load which is provided with AC output voltage $V_{ACOUT}$. AC bus lines 34 and 35 connect input terminal 30 to output terminal 32 and input terminal 31 to output terminal 33, respectively. Circuit breakers 36, connected in series with one or both of the AC bus lines 34 and 35, are preferably provided to automatically disconnect the dynamic voltage sag corrector 20 (and a load connected thereto) from the input voltage source if the current through the dynamic voltage sag corrector 20 from the source to the load becomes excessive due to a fault condition, such as a short circuit in the load. The circuit breaker 36 may be implemented in a conventional manner. As long as the circuit breakers 36 are closed, the dynamic voltage sag corrector 20 is powered up and in operation to provide a protected output voltage signal at output terminals 32 and 33 to a load.

As described previously, a dynamic voltage sag corrector 20 in accordance with the present invention includes a static bypass switch 26 and a regulator/storage module 28. The static bypass switch 26 is connected in series with one of the AC bus lines 34 between input terminal 30 and output terminal 32 of the dynamic voltage sag corrector 20. (The static bypass switch 26 may be connected in series with either of the AC bus lines 34 or 35.) The static bypass switch 26 may be implemented in a conventional manner to carry an AC voltage signal on the AC bus line 34 between the input 30 and output 32 terminals when the switch 26 is closed. Conventional solid state switching devices may be used to implement the static bypass switch 26. For example, anti-parallel connected thyristors, connected to conduct in opposite directions, may preferably be used to implement the static bypass switch 26. Alternatively, power transistor switching devices, similarly connected, may be used to implement the static bypass switch 26. The type of power switching devices employed in the static bypass switch 26, and the rating of such devices, will depend upon the voltage level which is to be normally conducted through and blocked by the static bypass switch 26 from the input terminals 30 and 31 to a load connected to the output terminals 32 and 33 of the dynamic voltage sag corrector 20.

The regulator/storage module 28 is preferably implemented as an AC power conversion circuit which employs a minimum number of switching devices to provide a corrected output voltage signal to a load connected to the output terminals 32 and 33 when there is a sag or drop in the source voltage signal $V_{ACIN}$ provided on the input terminals 30 and 31 of the voltage sag corrector 20. A variation of the AC power conversion circuit illustrated and described in U.S. Pat. No. 5,099,410 is preferably employed for this purpose. The specification of U.S. Pat. No. 5,099,410 is hereby incorporated herein by reference.

Figure 2:
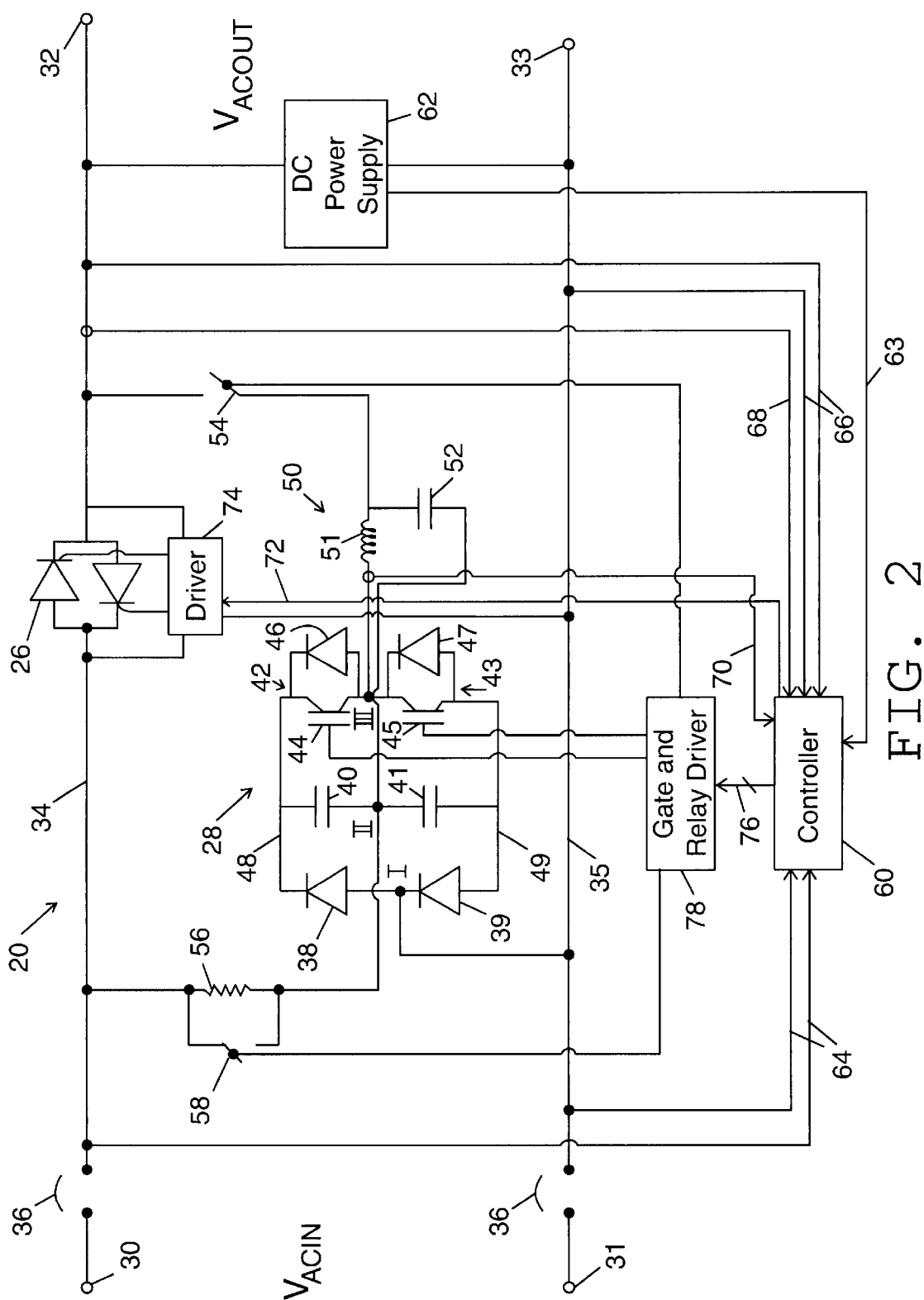
FIG. 2 is a schematic circuit diagram of a dynamic voltage sag corrector in accordance with the present invention.

The preferred regulator/storage module circuit 28 has three terminals or nodes, marked I, II, and III in FIGS. 1 and 2. Terminal or node I is connected to AC bus line 35, which directly connects input terminal 31 to output terminal 33 of the dynamic voltage sag corrector 20. Thus, terminal I of the regulator/storage module 28 is connected to both the input voltage source and the load whenever the dynamic voltage sag corrector 20 is in use. Terminal or node I of the regulator/storage module circuit 28 is a connecting point or node between two series connected rectifying devices 38 and 39. Rectifying devices 38 and 39 are connected together to conduct in the same direction, i.e., with the device 38 connected to conduct away from the node or terminal I and the device 39 connected to conduct toward the node or terminal I. The rectifying devices 38 and 39 may be implemented in a conventional manner, preferably using semiconductor diodes. Alternatively, controllable switching devices, e.g., transistors, may be used to implement the rectifying devices 38 and 39.

The second node or terminal II is connected to the other AC bus line 34 between the input terminal 30 and the static bypass switch 26. Thus, when the static bypass switch 26 is opened, the terminal or node II is connected only to an input voltage source at input terminal 30 of the dynamic voltage sag corrector 20. The node or terminal II is a connecting point or node which joins together a pair of storage capacitors 40 and 41 which are connected together in series.

The third node or terminal III is connected to the AC bus line 34 between the static bypass switch 26 and the output terminal 32 of the dynamic voltage sag corrector 20. Thus, when the static bypass switch 26 is opened, the third node or terminal III is connected only to a load connected to output terminal 32 of the dynamic voltage sag corrector 20. The third node or terminal III is a connecting point or node which joins together series connected inverter switching devices 42 and 43. The inverter switching devices 42 and 43 may be implemented in a conventional manner, e.g., by solid state transistors 44 and 45 with anti-parallel connected diodes 46 and 47, respectively.

The pair of rectifying devices 38 and 39, the pair of storage capacitors 40 and 41, and the pair of inverter switching devices 42 and 43 are connected together in parallel by DC bus lines 48 and 49. The lines 48 and 49 are referred to as DC bus lines because the voltage across them is unipolar, but it is understood that the actual voltage across the lines will be time varying.

A low pass filter 50 is preferably connected between the inverter switching devices 42 and 43 and the AC bus line 34 (output terminal 32 of the dynamic voltage sag corrector 20). The low pass filter 50 may be implemented in a conventional manner, e.g., using a series connected filter inductor 51 in combination with a parallel connected filter capacitor 52. As will be discussed in more detail below, the low pass filter 50 filters high frequency switching components from the AC signal provided by the regulator/storage module circuit 28 to the load.

An output relay 54 is preferably connected between the low pass filter 50 and the AC bus line 34. The output relay 54 may be implemented in a conventional manner. As will be discussed in more detail below, the output relay 54 is opened to prevent the charging of storage capacitors 40 and 41 through the inverter switching device diodes 46 and 47 during system start up and to isolate a load from the regulator/storage module circuit 28 in the event of an output overvoltage condition.

A charging resistor 56 is preferably connected between the storage capacitors 40 and 41 and the AC bus line 34. As will be described in more detail below, the charging resistor 56 is provided to ensure soft charging of the storage capacitors 40 and 41 from the input voltage signal provided on the AC bus line 34 at start-up of the voltage sag corrector 20. An input relay 58 is preferably connected in parallel across the charging resistor 56. The input relay 58 may be implemented in a conventional manner. As will be discussed in more detail below, the input relay 58 is provided to bypass the charging resistor 56 once the storage capacitors 40 and 41 have been initially charged.

The dynamic voltage sag corrector 20 is controlled by a system controller 60. The system controller 60 may be implemented using a programmable integrated circuit, such as a microprocessor, using discreet analog and/or digital components, or using a combination thereof. A controller 60 implemented using a programmable microcontroller is preferred. The controller 60 is provided with operating power from a DC power supply 62, which preferably is connected across the AC bus lines 34 and 35 at the output terminals 32 and 33 of the dynamic voltage sag corrector 20 such that the power supply 62 receives power either directly from the input terminals 30 and 31, when the static bypass switch 26 is closed, or from the regulator/storage module 28, when an input voltage sag condition is being corrected. The DC power supply 62 may be implemented in a conventional manner using, for example, a commercially available integrated circuit power supply for providing the required operating voltage levels to the system controller 60 from the AC voltage signal provided on output terminals 32 and 33.

The system controller 60 monitors voltage and current signals in the dynamic voltage sag corrector 20, and controls the dynamic voltage sag corrector 20 in response to those monitored signals. The system controller 60 preferably monitors the input voltage signal $V_{ACIN}$ across the input terminals 30 and 31, via lines 64, the output voltage signal $V_{ACOUT}$ across the output terminals 32 and 33, via lines 66, the current provided to the load on AC bus line 34, via a line 68, and the inverter current through the regulator/storage module 28, on a line 70. The current and voltage signals may be monitored by the system controller 60 in a conventional manner, using, e.g., conventional current transformers and hall effect devices to monitor current levels.

Based on the monitored voltage and current levels, the system controller 60 generates control signals for controlling the regulator/storage module 28 and the static bypass switch 26. Control signals for opening and closing the static bypass switch 26 are provided on a line 72 to a static bypass switch driver circuit 74. The static bypass switch driver circuit 74 may be implemented in a conventional manner to generate drive signals for the static bypass switching devices from the control signals provided by the controller 60. Control signals for controlling the inverter switching devices 42 and 43 and the input 58 and output 54 relays are provided from the system controller 60 on lines 76 to a gate and relay driver circuit 78. The gate and relay driver circuit 78 may be implemented in a conventional manner to provide gate drive signals to the inverter switching devices 42 and 43 and relay drive signals to the relays 54 and 58 based on the control signals provided by the system controller 60.

Figure 3:
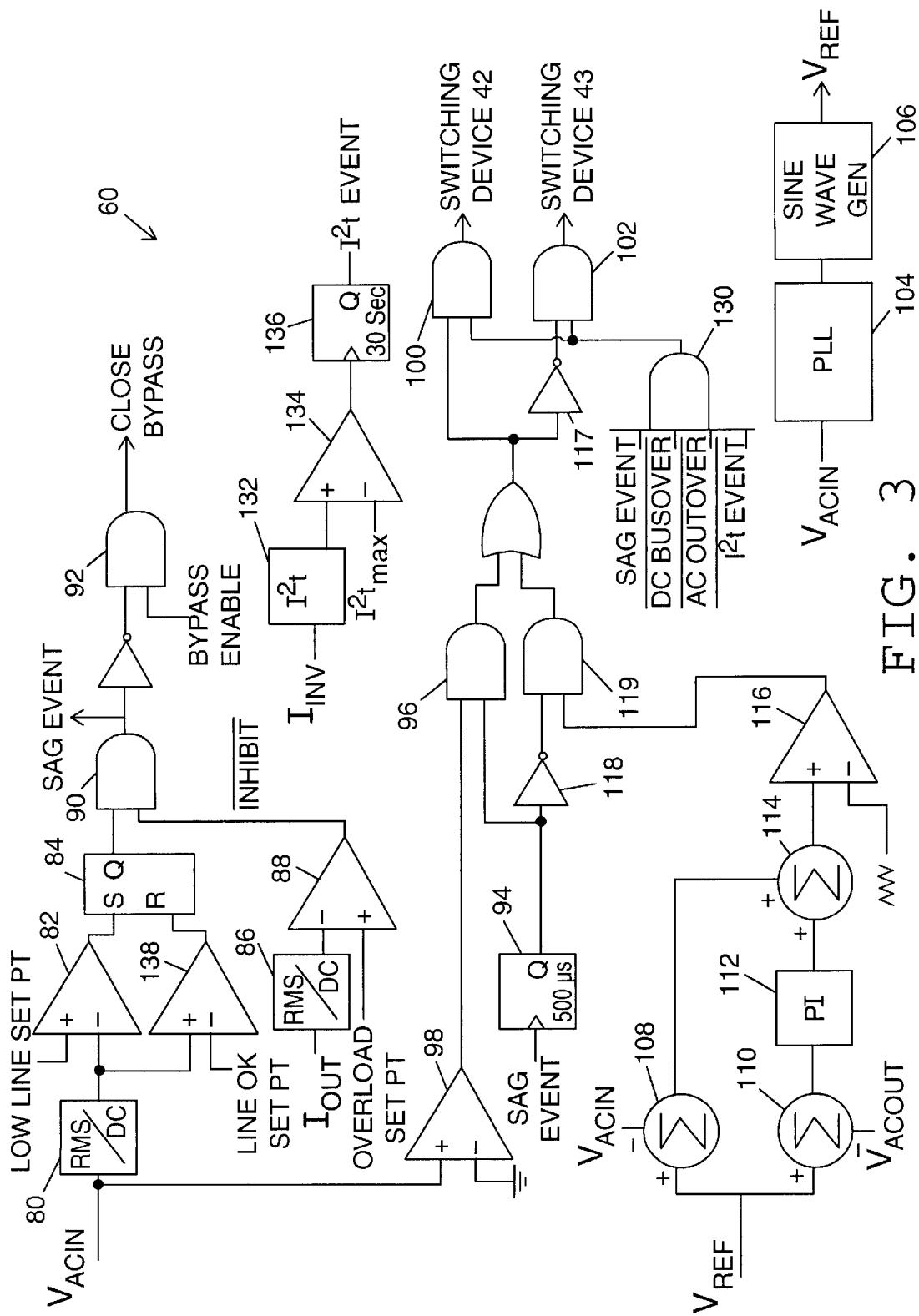
FIG. 3 is a schematic block diagram of a system controller for a dynamic voltage sag corrector in accordance with the present invention.

Operation of the system controller 60 will be described in detail with reference to the schematic block diagram of FIG. 3 which illustrates operation of the controller 60. The schematic block diagram of FIG. 3 is provided to illustrate the functions performed by an exemplary system controller 60 for a dynamic voltage sag corrector 20 in accordance with the present invention. Although a system controller 60 in accordance with the present invention may be implemented using integrated circuit amplifiers, gates, and other discrete components, as illustrated in FIG. 3, many of the functions implemented by the gates and other components illustrated in FIG. 3 may be implemented in a programmable logic device or a programmed microcontroller. Based on the schematic block diagram provided in FIG. 3, and the detailed description of operation of the controller 60 to follow, a person skilled in the art will be able to implement a system controller 60 to control a dynamic voltage sag corrector 20 in accordance with the present invention in various ways using various combinations of circuit components.

A dynamic voltage sag corrector 20 in accordance with the present invention operates as a series connected voltage source to boost available line voltage $V_{ACIN}$ so as to present a regulated output voltage $V_{ACOUT}$ to a load. The dynamic voltage sag corrector 20 derives power from the input power signal provided to the input terminals 30 and 31 during voltage sags, and from the storage capacitors 40 and 41 in the regulator/storage module 28 during complete voltage outages, from which the voltage sag corrector 20 produces a sinusoidal output voltage waveform as an additive voltage between the input and output terminals.

With the circuit breakers 36 closed, AC power is provided on input terminals 30 and 31 from an input voltage source to the dynamic voltage sag corrector 20. Under normal operating conditions, the static bypass switch 26 is closed. Therefore, under normal conditions, line power is provided to a load connected to the output terminals 32 and 33 directly from the input terminals 30 and 31, via the static bypass switch 26.

The input relay 58 is preferably open upon initially powering up the dynamic voltage sag corrector 20. The storage capacitors 40 and 41 in the regulator/storage module 28 are thus soft charged through the charging resistor 56 from the line signal provided on input terminals 30 and 31 during initial power up. During a positive half cycle of the input voltage waveform, the storage capacitor 41 is charged by current flowing from the input terminal 30, through the resistor 56, into the capacitor 41, through rectifier 39, and back to input terminal 31. During a negative half cycle of the input voltage waveform, the other storage capacitor 40 is charged by current flowing from input terminal 31, through rectifier 38, into capacitor 40, through resistor 56, and back to input terminal 30. The charging resistor 56 prevents a rapid in rush of current to the capacitors 40 and 41 at system startup, when the capacitors 40 and 41 are likely to be completely discharged. After a short delay, e.g., two seconds from system startup, the system controller 60 provides a control signal to the relay driver circuit 78 which, in turn, generates a relay drive signal to close the input relay 58, to bypass the charging resistor 56, thereby directly connecting the input terminal 30 to the storage capacitors 40 and 41.

The output relay 54 is preferably also open during the short period following system startup during which the storage capacitors 40 and 41 are initially charged. Opening the output relay 54 during initial charging of the storage capacitors 40 and 41 prevents the storage capacitors 40 and 41 from charging through the anti-parallel diodes 46 and 47 of the inverter switching devices 42 and 43. After the brief delay, e.g., two seconds, following system startup, the system controller 60 provides a control signal to the gate and relay driver circuit 78 which, in turn, generates a relay drive signal to close the output relay 54 to connect the inverter switching devices 42 and 43 to the output terminal 32 of the dynamic voltage sag corrector 20.

The input line voltage signal provided across the input terminals 30 and 31 of the dynamic voltage sag corrector 20 is preferably continuously monitored by the system controller 60 to determine whether or not the input line voltage signal is at an acceptable voltage level. If the input line voltage drops below an acceptable voltage level, a sag event is indicated. When a sag event is indicated, the static bypass switch 26 is opened, and the inverter switching devices 44 and 45 are controlled to provide an output voltage signal at the desired voltage level to a load connected to output terminals 32 and 33.

Any conventional method for detecting a voltage sag or voltage drop may be used to detect and indicate the occurrence of an input line voltage sag event. An exemplary method for detecting and indicating the occurrence of a voltage sag event is illustrated in FIG. 3. The RMS voltage level of the AC input line voltage signal $V_{ACIN}$ may be determined at 80. The RMS voltage level of the AC input line signal is compared with a selected low line voltage set point threshold at 82. The low line voltage set point threshold may be set at any voltage level, e.g., at 90% of the nominal RMS input voltage level. If the measured RMS input voltage level is less than the selected low line voltage set point threshold voltage level, the output of a logic flip flop 84 is set.

The setting of the output of the logic flip flop 84 may itself indicate the occurrence of a voltage sag event, to which the dynamic voltage sag corrector 20 of the present invention will respond by opening the static bypass switch 26 and controlling the regulator/storage module 28 to provide a desired AC output voltage signal to a load. However, if the current provided to the load on AC bus lines 34 and 35 during the normal operating condition preceding the voltage sag exceeds the capability of the regulator/storage module, a voltage sag event preferably is not indicated. Thus, the system controller 60 preferably monitors the load current during normal operation, and inhibits the providing of a voltage sag event indication if the monitored load current exceeds the capability of the voltage sag correction features of the system, thereby protecting the system inverter from overload. As illustrated in FIG. 3, the RMS value of the monitored output current provided on the output terminals is determined at 86. As described previously, the output current may be monitored in a conventional manner, e.g., using a current transformer having an output provided on a line 68 to the system controller 60. The RMS output current level signal is compared with a current overload set point threshold signal at 88. The current overload set point threshold is selected to correspond to the output current level beyond which the voltage sag corrector inverter cannot or should not be operated. If the monitored RMS output current level exceeds the current overload set point threshold, an inhibit signal is generated (e.g., the signal/INHIBIT is brought LOW). If, and only if, the inhibit signal is not activated, i.e., if the measured output current level is less than the current overload set point threshold level, and the output of the logic flip flop 84 is set, indicating that the RMS input voltage level is less than the selected low line voltage set point threshold, a sag event signal is provided at 90.

The occurrence of a sag event signal causes a close bypass signal to be disabled at 92. When the close bypass signal is disabled, control signals for driving the switching devices in the static bypass switch 26 are no longer provided by the system controller 60, via the driver circuit 74, to the static bypass switch 26. Thus, when a sag event occurs, operation of the static bypass switch 26 is disabled (i.e., the static bypass switch 26 is opened).

As described previously, the static bypass switch 26 may be implemented using anti-parallel connected thyristors. In such a case, current may continue to flow through the static bypass switch 26, even though drive signals are no longer provided to the switch 26, until the thyristors in the static bypass switch 26 are commutated off. To insure that the flow of current through the static bypass switch 26 is terminated following the occurrence of a voltage sag event detection, the system controller 60 preferably controls the inverter switching devices 42 and 43 to provide a commutating pulse to the bypass switch 26 following a voltage sag event detection, to ensure that the static bypass switch current goes to zero. The polarity of the commutating pulse provided to the switch 26 is determined by the polarity of the input line voltage at the time a sag event is detected.

As illustrated in FIG. 3, the system controller 60 preferably controls the inverter switching devices 42 and 43 to provide the desired commutating pulse by first generating a commutation pulse activation signal at 94. The commutation pulse activation signal is generated in response to the occurrence of a sag event, and is set to last for a selected duration, e.g., 500 microseconds, sufficient to provide the desired commutation pulse. The commutation pulse activation signal is combined with a signal corresponding to the polarity of the input voltage signal $V_{ACIN}$ at 96. The input voltage polarity signal is generated at 98. If the instantaneous polarity of the input voltage signal $V_{ACIN}$ is positive, an active (HIGH) signal is provided by the comparator 98. If the polarity of the input voltage signal $V_{ACIN}$ is negative, an inactive (LOW) signal is provided by the comparator 98. If the input voltage polarity signal is active and the commutation pulse activation signal is active, an active switching device control signal for inverter switching device 42 is provided via gate 100. When inverter switching device 42 is activated in response to the active switching device control signal, a voltage signal corresponding to the instantaneous input line voltage level plus the voltage level across storage capacitor 40 is applied to the output side of static bypass switch 26, thereby reversing the voltage across the static bypass switch 26, rapidly driving the current through the switch 26 to zero, to commutate the static bypass switch 26 off when the polarity of the input voltage signal applied at input terminals 30 and 31 of the dynamic voltage sag corrector 20 is positive. If the input voltage polarity signal is inactive, and the commutation pulse activation signal is active, an active inverter switching device control signal is provided to inverter switching device 43 via gate 102. When inverter switching device 43 is activated in response to the active switching device control signal, a negative polarity voltage signal having an amplitude corresponding to the instantaneous input line voltage level plus the voltage across storage capacitor 41 is applied across the static bypass switch 26, thereby reversing the voltage across the bypass switch 26 to rapidly drive the current therethrough zero, to commutate the static bypass switch 26 off when the polarity of the input voltage waveform at input terminals 30 and 31 of the dynamic voltage sag corrector 20 is negative. After the time for performing commutation of the static bypass switch 26 has passed, the commutation pulse activation signal provided at 94 is deactivated. When the commutation pulse activation signal is deactivated, the effect of the input line voltage polarity signal on switching of the inverter switching devices 42 and 43 is disabled at 96. After the commutation pulse provided by the regulator/storage module 28 to the static bypass switch 26 is removed, when the commutation pulse activation signal is disabled, low pass filter 50, formed by inductor 51 and capacitor 52, will ring for a short duration. Ringing of the low pass filter 50 produces a commutation pulse to the static bypass switch 26 which is in opposite polarity to that provided by the regulator/storage module 28 during the time the commutation pulse activation signal is active. The providing of current pulses of alternating polarity to the static bypass switch 26 insures that the static bypass switch 26 is commutated off following the detection of a sag event, regardless of the polarity of the input voltage signal at the time the sag event is detected.

After the brief commutation period is completed, the static bypass switch 26 is open, and no current flows therethrough. At this point, the system controller 60 begins to provide control signals to the inverter switching devices 42 and 43 to control the inverter switching devices 42 and 43 to provide an output voltage signal to a load connected to output terminals 32 and 33 of the dynamic voltage sag corrector 20. The inverter switching devices 42 and 43 are controlled to produce a sinusoidal output voltage waveform which boosts the available line voltage on input terminals 30 and 31, if any, to a selected percentage of the nominal output voltage level, e.g., to within ten percent of the nominal value. The regulator/storage module 28 operates generally in the following manner to provide a boosted voltage level to the system output terminals 32 and 33 in response to the detection of an input line voltage sag event.

When the AC line voltage signal $V_{ACIN}$ is in the positive half of its waveform, the voltage across storage capacitor 41 goes to the peak of the input line voltage signal as the capacitor 41 is charged through rectifier 39 (if sufficient source voltage is available). If, during the positive portion of the waveform of the input line voltage $V_{ACIN}$, the inverter switching device 42 is gated on, that is, into its conducting state, the input line voltage (positive going) and the voltage across capacitor 40 are impressed in series across the load. Thus, during a positive half cycle of the input voltage waveform, an output voltage signal is boosted to a desired voltage level by adding the voltage level stored on storage capacitor 40 to the available line voltage signal. During this half cycle, depending on the load circuit, the voltage across capacitor 40 will decrease as the capacitor 40 discharges. However, while storage capacitor 40 is being discharged into the load, the voltage across storage capacitor 41 may be building up, as it is being charged from the available input source voltage $V_{ACIN}$. A similar cycle is repeated during the half cycle of the source voltage waveform when the input line voltage $V_{ACIN}$ is negative. During this half cycle, if inverter switching device 43 is turned on, the input line voltage (negative going) and the voltage across capacitor 41 are impressed in series across the load to provide a boosted voltage level to the load. During this half cycle, the voltage level across storage capacitor 41 may decrease, as the capacitor 41 is discharged into the load, while the other storage capacitor 40 may be recharged to the peak of the available input line voltage signal $V_{ACIN}$ through rectifier 38.

Preferably, the inverter switching devices 42 and 43 are operated under pulse width modulation ("PWM") control to provide a conditioned sinusoidal power signal to the load. By employing PWM control of the inverter switching devices 42 and 43, the regulator/storage module 28 may be controlled to provide instantaneous output voltages to the load at any desired voltage level ranging between zero and twice the peak available line input voltage. Various PWM control techniques are well known in the art, and may be employed in the present invention.

An exemplary PWM control technique for controlling the inverter switching devices 42 and 43 to provide the desired output voltage signal to a load is illustrated in FIG. 3. A reference waveform $V_{REF}$ represents the desired output voltage waveform to be provided by the regulator/storage module on output terminals 32 and 33. Preferably, the reference waveform $V_{REF}$ is a sinusoidal voltage waveform having a desired RMS output voltage level. For example, the reference waveform $V_{REF}$ is preferably selected such that the inverter switching devices 42 and 43 are controlled to provide an output voltage waveform to the load which is at 90% or higher of the nominal RMS input voltage level. Preferably, the reference waveform $V_{REF}$ is phase synchronized with the input line voltage waveform $V_{ACIN}$. The reference waveform $V_{REF}$ may be derived, as illustrated in FIG. 3, by providing the input line voltage signal $V_{ACIN}$ to a phase lock loop circuit 104, which may be implemented in a conventional manner. The output from the phase lock loop 104 is provided to a conventional sine wave generator 106, which generates the reference waveform $V_{REF}$ in phase with the input voltage waveform $V_{ACIN}$ and at the desired RMS voltage level.

The reference waveform $V_{REF}$ is compared with the input line voltage waveform $V_{ACIN}$ at summing junction 108. The output of summing junction 108 thus represents the difference or error between the desired output voltage waveform signal ($V_{REF}$) and the available input line voltage waveform ($V_{ACIN}$). The reference waveform $V_{REF}$ is compared to the measured output voltage signal $V_{ACOUT}$ at summing junction 110. The output of summing junction 110 thus represents the difference or error between the desired output voltage signal ($V_{REF}$) and the measured output voltage signal ($V_{ACOUT}$). The output of summing junction 110 is provided to a proportional-integral controller 112, which may be implemented in a conventional manner. The output of the proportional-integral controller 112 is combined with the output of summing junction 110 at summing junction 114. The output of summing junction 114 corresponds to the voltage signal which must be provided by the regulator/storage module 28 to boost the available line voltage $V_{ACIN}$ to the desired output voltage level $V_{ACOUT}$. This signal is modulated in a conventional manner, e.g., by comparing the signal to a high frequency triangular carrier waveform signal at 116. Note that the frequency of the carrier signal used for modulating the control signal is preferably much higher than the frequency of the output signal $V_{ACOUT}$. Thus, for example, for an output frequency of 60 Hz, a modulation frequency of approximately 5 kHz or higher is preferred. The output of comparator 116 is a PWM switching device control signal. The high frequency switching device control signal is provided to inverter switching devices 42 and 43 via gates 100 and 102, respectively, and gate driver 78. The high frequency switching device control signals provided to the inverter switching devices 42 and 43 turn the switching devices 42 and 43 on and off alternately in a pattern defined by the control signals to generate the desired output voltage waveform. A sinusoidal output waveform is provided by use of the low frequency filter 50, which filters out the high frequency switching components from the waveform generated by the inverter switching devices 42 and 43. For example, for a 5 kHz modulation frequency, the inductor 51 and capacitor 52 in the low pass filter 50 are chosen to have a natural frequency of about 1 kHz, which is sufficient to produce a sinusoidal voltage across capacitor 52.

Note that the system controller 60 is preferably designed to ensure that switching devices 42 and 43 are never turned on simultaneously, which would create a short circuit between the DC bus lines 48 and 49. (Note gate 117.) Also, modulation of the switching devices 42 and 43 is disabled during the commutation period when the switching devices 42 and 43 are controlled to provide commutation of the static bypass switch 26. (Note gates 118 and 119.)

To protect the inverter switching devices 42 and 43 from damage, the providing of switching device control signals to the inverter switching devices 42 and 43 is preferably only enabled if certain conditions are satisfied. For example, the providing of switching device control signals to the inverter switching devices 42 and 43 is prevented unless a sag event indication occurs. The providing of switching device control signals to the inverter switching devices 42 and 43 is preferably also prevented if monitored current and voltage conditions in the dynamic voltage sag connector 20 are such that operation of the inverter switching devices 42 and 43 under such conditions could damage the inverter switching devices 42 and 43. Thus, for example, gates 100 and 102, through which the inverter switching device control signals pass, are preferably only enabled when an inverter switching device control enable signal is provided to the gates 100 and 102 from 130. The inverter switching device control enable signal preferably is only provided at 130 when a sag event is indicated, and if the voltage across the DC bus lines 48 and 49 is not excessive, and if the voltage across the AC output terminals 32 and 33 is not excessive, and if the inverter current through the regulator/storage module 28 is also not excessive. If any of these conditions is not satisfied, an active inverter switching device control enable signal is not provided at 130. A DC bus over-voltage condition or AC output overvoltage condition may be determined by monitoring the DC bus voltage (between DC bus lines 48 and 49) and the AC output voltage (between output terminals 32 and 33), and comparing the measured voltage levels to over-voltage threshold levels. If a measured voltage level exceeds an over-voltage threshold level, the output of gate 130 is disabled, thereby preventing control signals from being provided to the inverter switching devices 42 and 43. As an additional safety feature, the inverter current $I_{INV}$ through the regulator/storage module 28 is monitored for an over-current condition. An over-current condition may be detected and indicated by calculating the mean-square times time value of the inverter current $I_{INV}$ (provided on a line 70 to controller 60) at 132. As with the other calculations described herein, the $I^2t$ calculation may be performed by a microprocessor. The output of the $I^2t$ calculation 132 is compared with a maximum allowable $I^2t$ threshold value at comparator 134. If the measured and calculated $I^2t$ value is higher than the maximum allowed value, an $I^2t$ event signal is provided at 136. The $I^2t$ event signal is held active for a selected duration, e.g., 30 seconds, providing sufficient time for the event to clear before operation of the inverter switching devices 42 and 43 is attempted again. The $I^2t$ event signal is provided as an input to gate 130, to disable the output of the gate 130, and, therefore, switching of the inverter switching devices 42 and 43, when an $I^2t$ event occurs, indicating that the inverter current exceeds the safe operating range for the inverter switching devices 42 and 43.

When a voltage sag condition has passed, and the line voltage signal $V_{ACIN}$ has returned to a near normal level, the system controller 60 stops controlling the inverter switching devices 42 and 43 to provide a desired output voltage waveform, and closes the static bypass switch 26 to directly connect the, now normal, line voltage to the output terminals 32 and 33. This may be accomplished, for example, as illustrated in FIG. 3, by comparing the RMS value of the line voltage signal, calculated at 80, with an acceptable line voltage set point threshold at 138. If the RMS value of the line voltage signal exceeds the acceptable line voltage set point threshold, the output of flip flop 84 is reset. The resetting of the output of flip flop 84 causes the sag event indicator signal to be deactivated, thereby preventing further modulation of the inverter switching devices 42 and 43, and causes the close bypass signal to be activated, thereby causing control signals to be provided to the static bypass switch 26 to close the static bypass switch 26. Note that the low line voltage set point threshold and the acceptable line voltage set point threshold are preferably set at different levels, to provide a degree of hysteresis.

It is apparent that a voltage sag corrector 20 in accordance with the present invention, employing the preferred regulator/storage module circuit described above, may be operated as a voltage booster by adding the voltage level on one of the storage capacitors 40 and 41 to the available input voltage signal while simultaneously recharging the other storage capacitor 40 or 41 to the peak of the available input voltage signal. Thus, a dynamic voltage sag corrector 20 in accordance with the present invention may provide correction for voltage sag conditions down to approximately 50% of the nominal input voltage level for an indefinite duration of time. However, for more serious voltage sags and voltage drops, wherein the available input voltage level drops to less than 50% of the nominal input voltage level, the duration for which the dynamic voltage sag corrector 20 can provide a near normal voltage signal to the load depends on the amount of energy stored in the storage capacitors 40 and 41 before the sag event occurs. Thus, one way to increase the duration for which correction of such extreme voltage sags and drops can be provided is to increase the size of the storage capacitors 40 and 41. However, increasing capacitor size would increase the size, cost, and weight of the dynamic voltage sag corrector. As an alternative, the duration for which the correction of extreme voltage sags and drops can be provided may be increased, without increasing the size of the storage capacitors 40 and 41, by dividing the entire load provided power via the dynamic voltage sag corrector into priority and non-priority load portions. The priority load portion may represent a critical subset of the entire load supplied through the dynamic voltage sag corrector 20. In situations where an extreme voltage sag or drop occurs, a dynamic voltage sag corrector in accordance with the present invention may be controlled to provide a near normal output voltage signal to the priority portion of the load for a longer duration than would be possible if the entire load had to be supplied by the voltage sag corrector.

Figure 4:
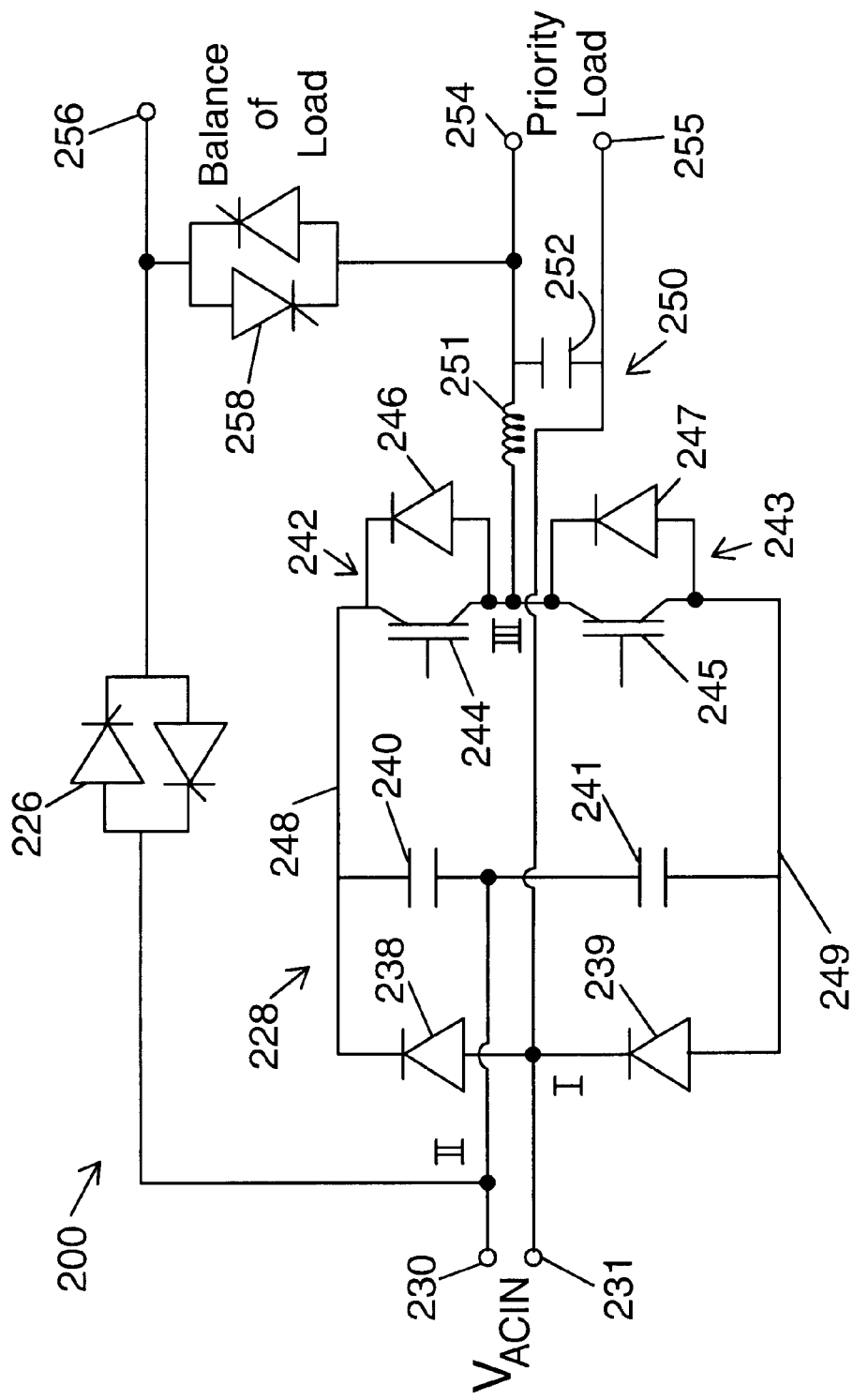
FIG. 4 is a schematic circuit diagram of an alternative embodiment of a dynamic voltage sag corrector in accordance with the present invention wherein the dynamic voltage sag corrector is configured to provide voltage sag correction to a priority portion of a load in response to extreme voltage sag/drop conditions.

An exemplary alternative embodiment of a dynamic voltage sag corrector 200 in accordance with the present invention which is configured to provide voltage sag correction to a priority portion of a load in response to an extreme voltage sag/drop condition, is illustrated in, and will be described with reference to, FIG. 4. The alternative embodiment dynamic voltage sag corrector 200 is similar to the dynamic voltage sag corrector 20 described previously. The dynamic voltage sag corrector 200 includes a static bypass switch 226 connected in parallel with a regulator/storage module 228 between input terminals 230 and 231 and a load. The regulator/storage module 228 includes a pair of rectifying devices 238 and 239 connected together in series at a first node or terminal I, a pair of storage capacitors 240 and 241 connected together in series at a second node or terminal II, and a pair of inverter switching devices 242 and 243 connected together in series at a third node or terminal III, with the pairs of rectifiers 238 and 239, storage capacitors 240 and 241, and inverter switching devices 242 and 243 connected together by DC bus lines 248 and 249. Under normal operating conditions, the static bypass switch 226 is closed. As described previously, the input line voltage $V_{ACIN}$ is monitored by a system controller (not shown in FIG. 4). When a voltage sag event is indicated, the system controller closes the static bypass switch 226, and controls the inverter switching devices 242 and 243 to provide a near normal output voltage signal to the load. A low-pass filter 250 is connected between the inverter switching devices 242 and 243 and the load to filter high frequency switching components from the inverter output signal, to thereby provide a nearly sinusoidal output voltage waveform to the load.

The alternative embodiment dynamic voltage sag corrector 200 has three output terminals 254, 255 and 256. Output terminals 254 and 255 are connected to the output of the regulator/storage module 228, i.e., to the output of low-pass filter 250. Output terminal 256 is connected to the output side of the static bypass switch 226. Output terminals 254 and 256 are connected together via a load bypass switch 258. The load bypass switch 258 may be implemented in a conventional manner, such as using anti-parallel connected thyristors, to conduct an AC voltage signal in both directions when the load bypass switch 258 is closed. The load to be provided power by the dynamic voltage sag corrector 200 is divided between the output terminals 254 and 256. The entire load is connected between output terminals 256 and 255. A priority portion of the load is connected between output terminals 254 and 255. Under normal operating conditions, when the available input line voltage level is normal, the static bypass switch 226 is closed, and the normal line voltage level is provided directly to the entire load at output terminal 256 via the static bypass switch 226. When a voltage sag event is indicated, such as when the input voltage level drops to less than 90% of the nominal input voltage level, the system controller closes the static bypass switch 226 and begins controlling the inverter switching devices 242 and 243 to provide a near normal output voltage level to the load. The system controller monitors the severity of the voltage sag. If the input line voltage sag is to an input voltage level greater than approximately half (e.g., greater than approximately 45%) of the nominal input voltage level, the regulator/storage module 228 may be controlled as a voltage booster to provide a near normal output voltage level (e.g., 90% of the nominal output voltage level) to the entire load indefinitely. Therefore, during such relatively minor voltage sag conditions, the load bypass switch 258 is closed, and the entire load is provided power from the regulator/storage module 228 through the load bypass switch 258. If, however, the voltage sag condition is more severe, e.g., down to 45% or less of the nominal input voltage level, the duration for which the regulator/storage module 228 can provide voltage sag correction is limited by the energy stored in the storage capacitors 240 and 241. The duration for which such voltage sag correction can be provided may be increased if the regulator/storage module 228 is not required to support the entire load. Therefore, under such extreme voltage sag conditions, the system controller preferably opens the load bypass switch 258, thereby disconnecting a portion of the load from the regulator/storage module 228. Under such extreme voltage sag conditions, only the priority portion of the load, connected between output terminals 254 and 255, is provided regulated power from the regulator/storage module 228. The storage capacitors 240 and 241 may be selected such that sufficient energy is stored in the storage capacitors 240 and 241 to provide power to the priority load for a sufficient duration (e.g., 10 seconds) during a complete voltage drop for the priority load to effect an orderly shutdown. The size, weight, and cost of storage capacitors 240 and 241 capable of storing sufficient energy to support the priority load for such a duration will be much less than if the storage capacitors 240 and 241 were required to store enough energy to support the entire load for a similar duration.

Figure 5:
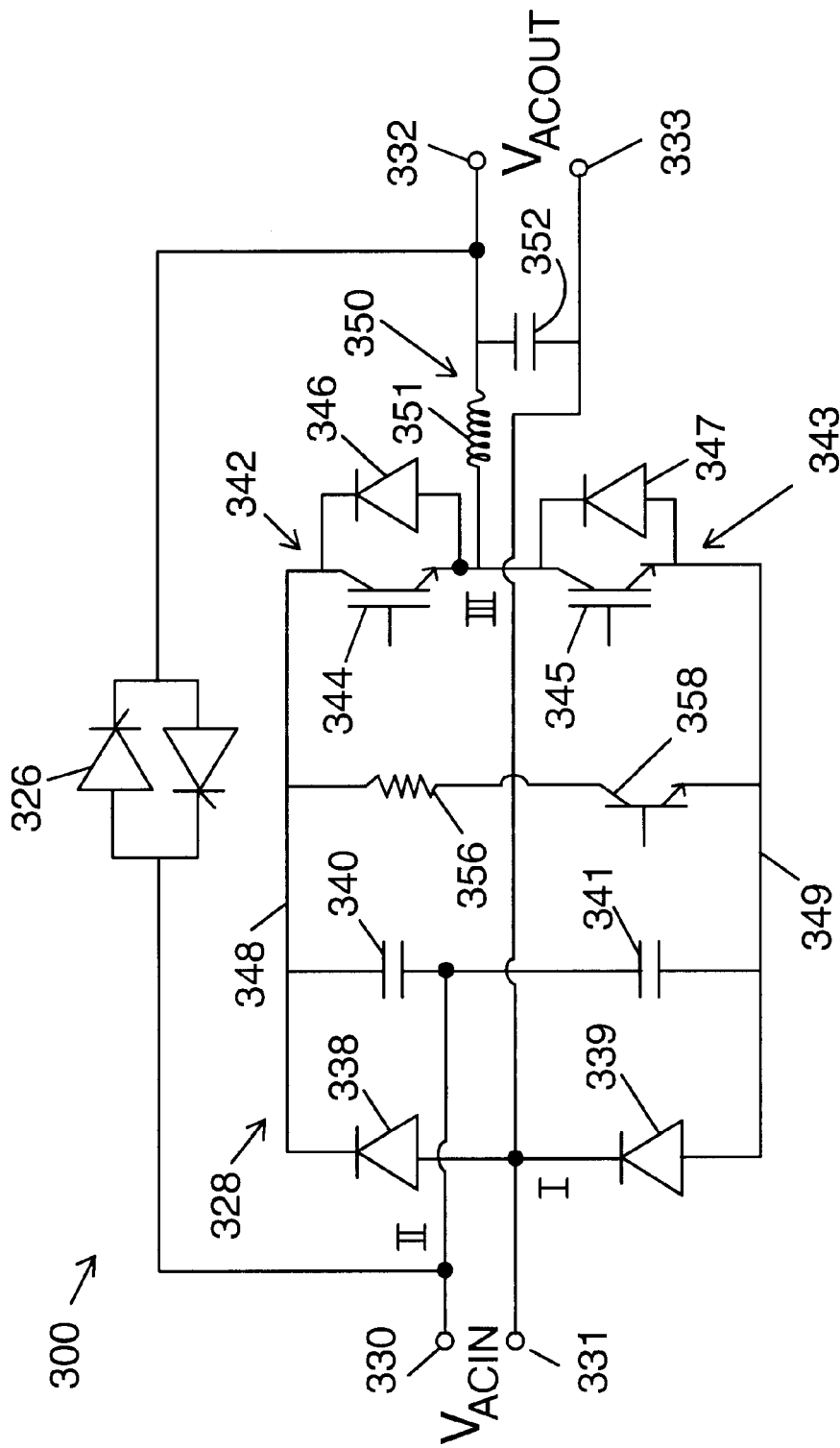
FIG. 5 is a schematic circuit diagram of another alternative embodiment of a dynamic voltage sag corrector in accordance with the present invention wherein the dynamic voltage sag corrector includes a dissipation circuit for dissipating excess energy stored in the circuit as a result of a voltage surge condition for which correction is provided by the dynamic voltage sag corrector.

A dynamic voltage sag corrector in accordance with the present invention may be controlled to provide correction of voltage surge conditions as well as voltage sag conditions. An exemplary alternative embodiment of a dynamic voltage sag corrector 300 in accordance with the present invention for providing voltage surge as well as voltage sag correction is illustrated in, and will be described with reference to, FIG. 5. The alternative embodiment dynamic voltage sag corrector 300 includes a static bypass switch 326 connected in parallel with a regulator/storage module 328 between input terminals 330 and 331, and a load, which may be connected to output terminals 332 and 333. As discussed previously, the regulator/storage module 328 preferably includes a power conversion circuit which includes rectifying devices 338 and 339 connected together in series at a first node or terminal I, storage capacitors 340 and 341 connected together in series at a second node or terminal II, and inverter switching devices 342 and 343 connected together in series at a third node or terminal III, with the pairs of rectifiers 338 and 339, storage capacitors 340 and 341, and switching devices 342 and 343 connected together in parallel by DC bus lines 348 and 349. Under normal operating conditions, when the available input line voltage is at or near a normal voltage level, the static bypass switch 326 is closed to provide AC power to the load directly from the input terminals 330 and 331 via the static bypass switch 326. A system controller (not shown in FIG. 5) monitors the input line voltage signal $V_{ACIN}$. If the available line voltage level sags below a selected percentage of the nominal line voltage level, the system controller opens the static bypass switch 326, and controls the inverter switching devices 342 and 343 to provide a near normal output voltage signal to the load on output terminals 332 and 333, in the manner described previously. A low-pass filter 350 is preferably connected between the inverter switching devices 342 and 343 and the output terminals 332 and 333, to filter high frequency switching components from the inverter signal, to thereby provide a near sinusoidal output voltage waveform $V_{ACOUT}$ to the load.

The system controller preferably also monitors the line voltage signal to detect a voltage surge condition, wherein the input line voltage level exceeds the nominal line voltage level by more than a selected amount (e.g., by more than 10%). The system controller responds to the detection of a voltage surge condition in a manner similar to when a voltage sag condition is indicated. When a voltage surge condition is indicated, the system controller opens the static bypass switch 326, and controls the inverter switching devices 342 and 343 in a voltage-buck mode to provide an output voltage signal $V_{ACOUT}$ at a near normal output voltage level to the load on terminals 332 and 333. The inverter switching devices 342 and 343 may be controlled in a conventional manner, e.g., using PWM control, as described previously, to provide the desired output voltage signal $V_{ACOUT}$ to the load during voltage surge conditions. During a voltage surge condition, which is typically very short-lived, more energy is provided to the regulator/storage module 328 than is provided to the load from the regulator/storage module 328. Thus, during the voltage surge, one or both of the storage capacitors 340 and 341 may become charged to a voltage level in excess of the nominal peak voltage level of the input line voltage signal $V_{ACIN}$. An energy dissipation circuit, including a resistor 356 connected in series with a switching device 358, such as an IGBT or other type of transistor, is preferably connected across the DC bus lines 348 and 349 to dissipate the excess energy which may become stored in the capacitors 340 and 341 during a voltage surge. The system controller controls the dissipation circuit switching device 358 to close the switching device 358 to thereby allow current to flow from the storage capacitors 340 and 341 through the dissipation resistor 356 to dissipate any excess energy stored in the capacitors 340 and 341.

Figure 6:
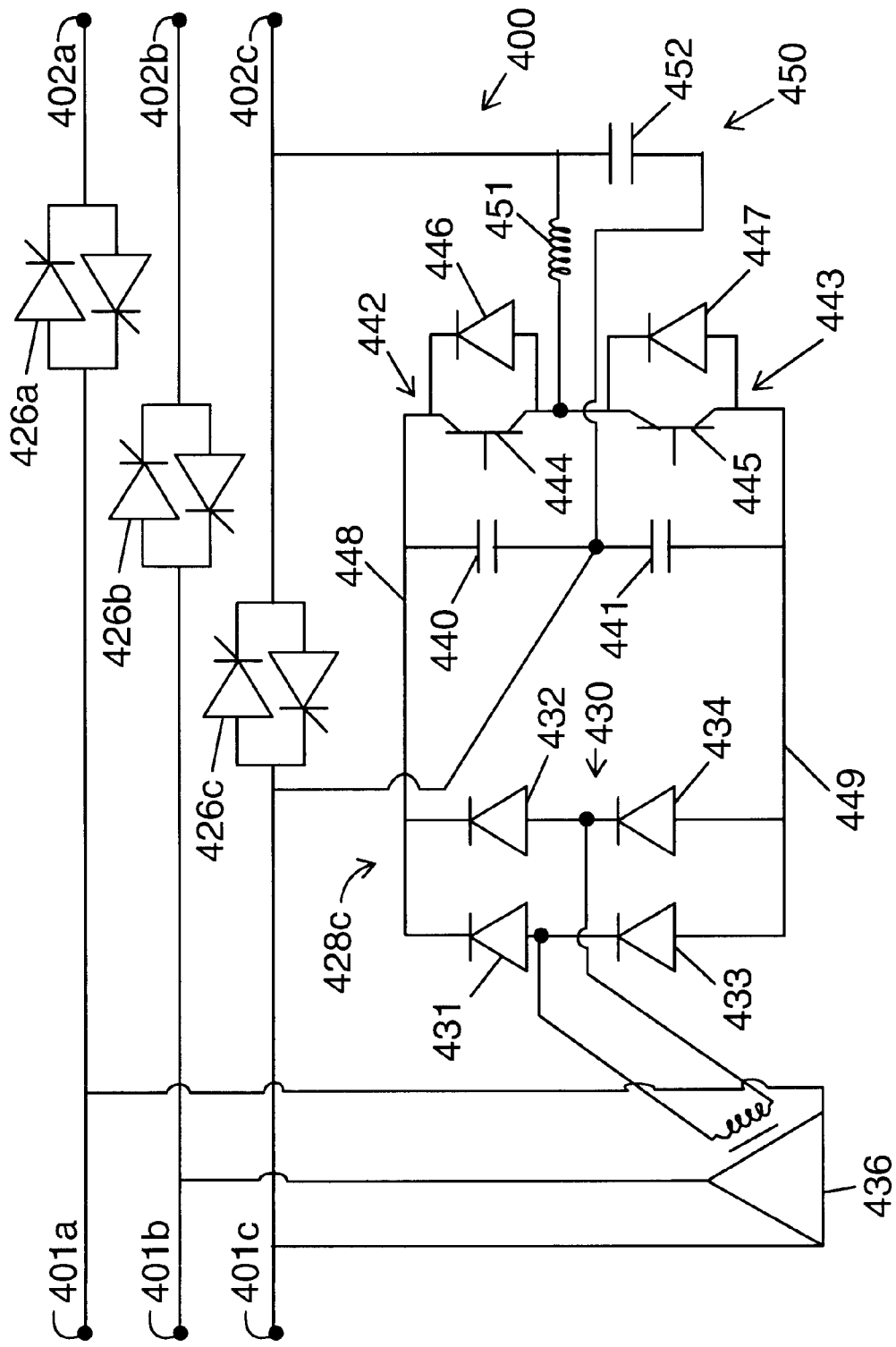
FIG. 6 is a schematic circuit diagram of an exemplary three phase embodiment of a dynamic voltage sag corrector in accordance with the present invention.

It should be understood that a dynamic voltage sag corrector in accordance with the present invention may be employed to provide voltage sag (and surge) correction for multi-phase, as well as single-phase, systems. An exemplary dynamic voltage sag corrector 400 for use in a three-phase system is illustrated in, and will be described with reference to, FIG. 6. Three-phase input terminals 401a–c are adapted to be connected to an unprotected three-phase input line power source. Three-phase output terminals 402a–c are adapted to be connected to a three-phase load. A three-phase dynamic voltage sag corrector 400 in accordance with the present invention is connected between the input terminals 401a–c and the output terminals 402a–c. In this exemplary embodiment, the three-phase dynamic voltage sag corrector 400 is implemented essentially using three single-phase voltage sag correctors. The three-phase dynamic voltage sag corrector 400 includes static bypass switches 426a–c connected between input terminals 401a–c and output terminals 402a–c, respectively, and regulator/storage modules 428a–c (only regulator/storage module 428c is shown in FIG. 6) connected in parallel with each static bypass switch 426a–c. Each regulator/storage module 428a–c preferably includes a power conversion circuit of the type described previously. Since the power conversion circuits in each regulator/storage module 428a–c are identical, only one such power conversion circuit will be described in detail herein. Each power conversion circuit preferably includes a rectifier bridge 430, a pair of series connected storage capacitors 440 and 441, and a pair of series connected inverter switching devices 442 and 443, connected together in parallel between DC bus lines 448 and 449. The rectifier bridge 430 includes rectifier devices 431, 432, 433 and 434, which preferably may be implemented as diodes or, alternatively, as switched rectifying devices. The rectifier bridge 430 is coupled to the input terminals 401a–c via a three-phase transformer 436. Thus, the three-phase input line voltage signal on the input terminals 401a–c is rectified by the rectifier bridge 430 to charge the storage capacitors 440 and 441 to the peak of the available input line voltage signal. During normal operation, when the input line voltage level is normal, the static bypass switches 426a–c are closed, and three-phase power is provided directly to the output terminals 402a–c from the input terminals 401a–c via the static bypass switches 426a–c. A system controller (not shown in FIG. 6) monitors the three-phase input line voltage signal on input terminals 401a–c (or the output voltage on output terminals 402a–c) to detect a voltage sag condition. When a voltage sag condition is indicated, the system controller opens the static bypass switches 426a–c, and controls the inverter switching devices 442 and 443 in the regulator/storage modules 428a–c to provide a near normal three-phase output voltage signal on output terminals 402a–c by adding the stored voltage on storage capacitors 440 and 441 to the available input line voltage signal in the manner described previously. A low-pass filter 450 provided in each power conversion circuit filters high frequency switching components from the signal provided by the circuit to ensure that a near sinusoidal three-phase output voltage waveform is provided to the load on output terminals 402a–c. Thus, a three-phase or other multi-phase dynamic voltage sag corrector in accordance with the present invention may be implemented by providing a separate static bypass switch and regulator/storage module for each phase.

Figure 7:
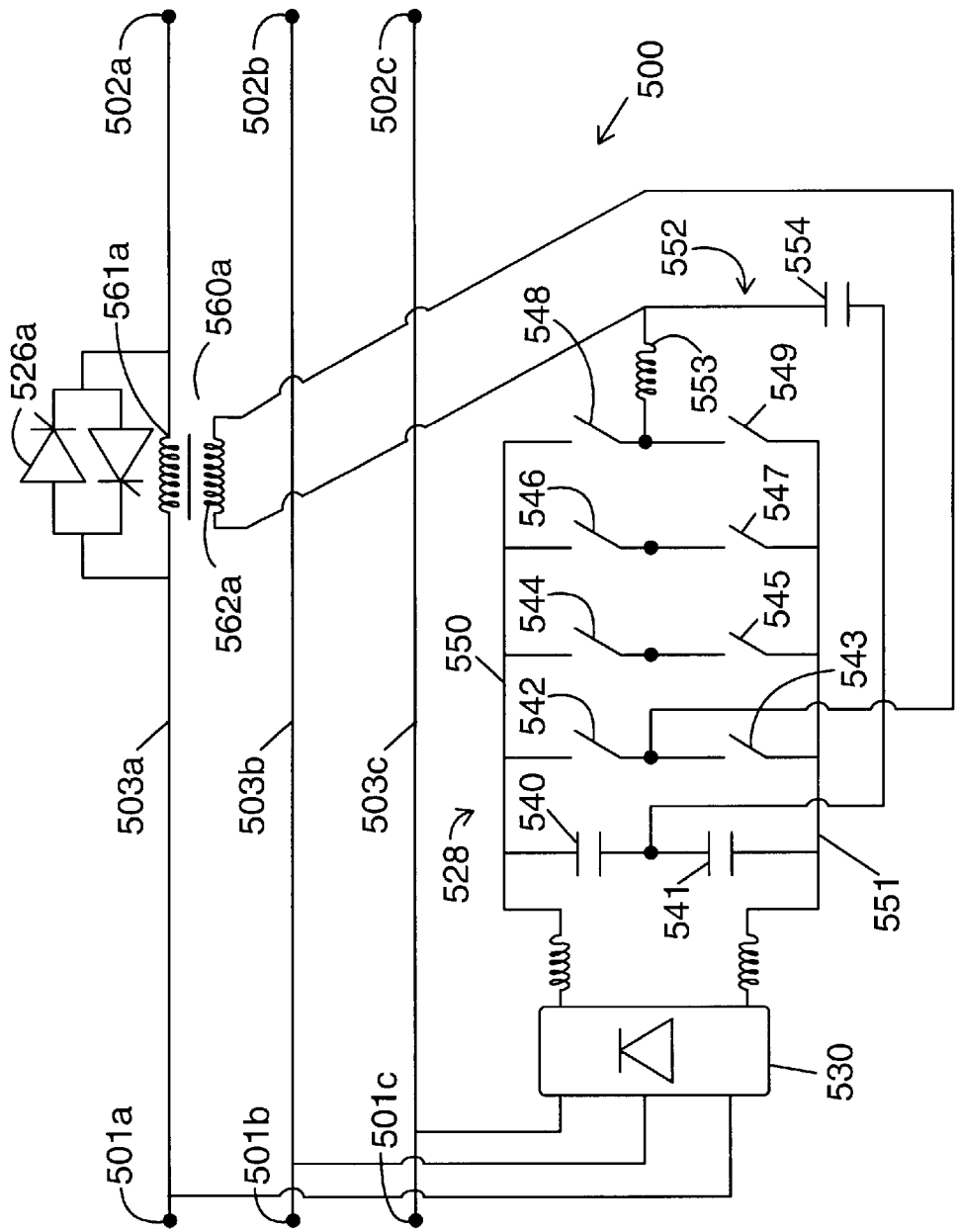
FIG. 7 is a schematic circuit diagram of another exemplary three phase embodiment of a dynamic voltage sag corrector in accordance with the present invention.

An alternative exemplary embodiment of a multi-phase dynamic voltage sag corrector 500 in accordance with the present invention is illustrated in, and will be described with reference to, FIG. 7. An unprotected three-phase input line voltage signal may be provided on input terminals 501*a–c*. A three-phase output voltage signal is provided on output terminals 502*a–c* to a load. A static bypass switch is connected between each input terminal 501*a–c* and its corresponding output terminal 502*a–c* on three-phase AC bus lines 503*a–c*. (For simplicity, only a single such static bypass switch 526*a* is shown in FIG. 7.) In accordance with this embodiment of the present invention, a single four-leg inverter power conversion circuit 528 is connected in parallel with each static bypass switch 526*a–c* between the input terminals 501*a–c* and output terminals 502*a–c*. The four-leg inverter power conversion circuit 528 includes a three-phase rectifier 530 connected between the three-phase input terminals 501*a–c* and DC bus lines 550 and 551, a pair of series connected storage capacitors 540 and 541 connected across the DC bus lines, and four pair of series connected inverter switching devices 542 and 543, 544 and 545, 546 and 547, and 548 and 549 connected across the DC bus lines. The three-phase rectifier 530 rectifies the three-phase input line voltage signal on input terminals 501*a–c* to provide a DC voltage signal on DC bus lines 550 and 551, to thereby charge the storage capacitors 540 and 541 to near the peak value of the available input line voltage signal on input terminals 501*a–c*. The inverter switching devices 542–549 form a four-leg inverter topology. The inverter switching devices 542–549 may be implemented in a conventional manner, as described above, such as using IGBTs or other power-switching devices, with anti-parallel connected diodes. Four-leg inverter topologies and methods of controlling four-leg inverters to provide three-phase output voltage signals are well known in the art. The four-leg inverter is coupled to the output terminals 502*a–c* such that the inverter switching devices 542–549 may be controlled to provide a three-phase output voltage signal to the output terminals 502*a–c*. The four-leg inverter 528 may be coupled in parallel with the static bypass switches 526*a–c* using a transformer connected in parallel with each static bypass switch. For example, a transformer 560*a* may be connected between input terminal 501*a* and output 502*a* in parallel with static bypass switch 526*a*. One winding 561*a* of the transformer 560*a* is connected between input terminal 501*a* and output terminal 502*a*. The other winding 562*a* of the transformer 560*a* is connected at one end thereof to an output node of a first leg of the four-leg inverter 528, e.g., between inverter switching devices 542 and 543. The other end of this winding 562*a* of the transformer 560*a* is connected to the output node of the fourth or neutral leg of the four-leg inverter 528, e.g., between inverter switching devices 548 and 549. The four-leg inverter 528 is coupled in parallel with the other static bypass switches 526*b–c* in a similar manner. (For example, a transformer connected in parallel with a second static bypass switch may have a winding connected between the output node of the second leg of the four-leg inverter 528, between inverter switching devices 544 and 545, and the output node of the fourth leg of the four-leg inverter 528. A transformer connected in parallel with a third static bypass switch may have a winding connected between the output node of the third leg of the four-leg inverter 528, between inverter switching devices 546 and 547, and the output node of the fourth leg of the four-leg inverter 528.) A low pass filter 552, which may include a series connected inductor 553 and a parallel connected capacitor 554, is preferably connected between the fourleg inverter 528 and the transformers 560*a–c* coupling the inverter 528 to the output terminals 502*a–c*, to filter high frequency switching components from the multiphase signal provided by the four-leg inverter 528 such that a near sinusoidal three-phase output voltage waveform is provided to a load connected to output terminals 502*a–c*.

As described previously, under normal operation conditions, when the three-phase input line voltage signal provided on input terminals 501*a–c* is at or near a normal voltage level, the static bypass switches 526*a–c* are closed, and a three-phase power signal is provided directly from the input terminals 501*a–c* to the output terminals 502*a–c* via the static bypass switches 526*a–c*. A system controller (not shown in FIG. 7) monitors the three-phase voltage signal available to the load. If a voltage sag (or surge) condition is indicated, the system controller opens the static bypass switches 526*a–c*, and controls the switching devices 542–549 in the four-leg inverter 528 to provide a near normal three-phase voltage signal to a load connected to output terminals 502*a–c*. The control of a four-leg inverter to provide a desired three-phase output voltage waveform using PWM modulation techniques is well known in the art. Note that the power conversion circuit topology 528 illustrated in FIG. 7 is controlled to provide a desired three-phase output voltage waveform by adding a voltage level on storage capacitors 540 and 541 to the available three-phase line voltage level on input terminals 501*a–c* by injecting voltage signals on AC bus lines 503*a–c* between input terminals 501*a–c* and output terminals 502*a–c*.

Figure 8:
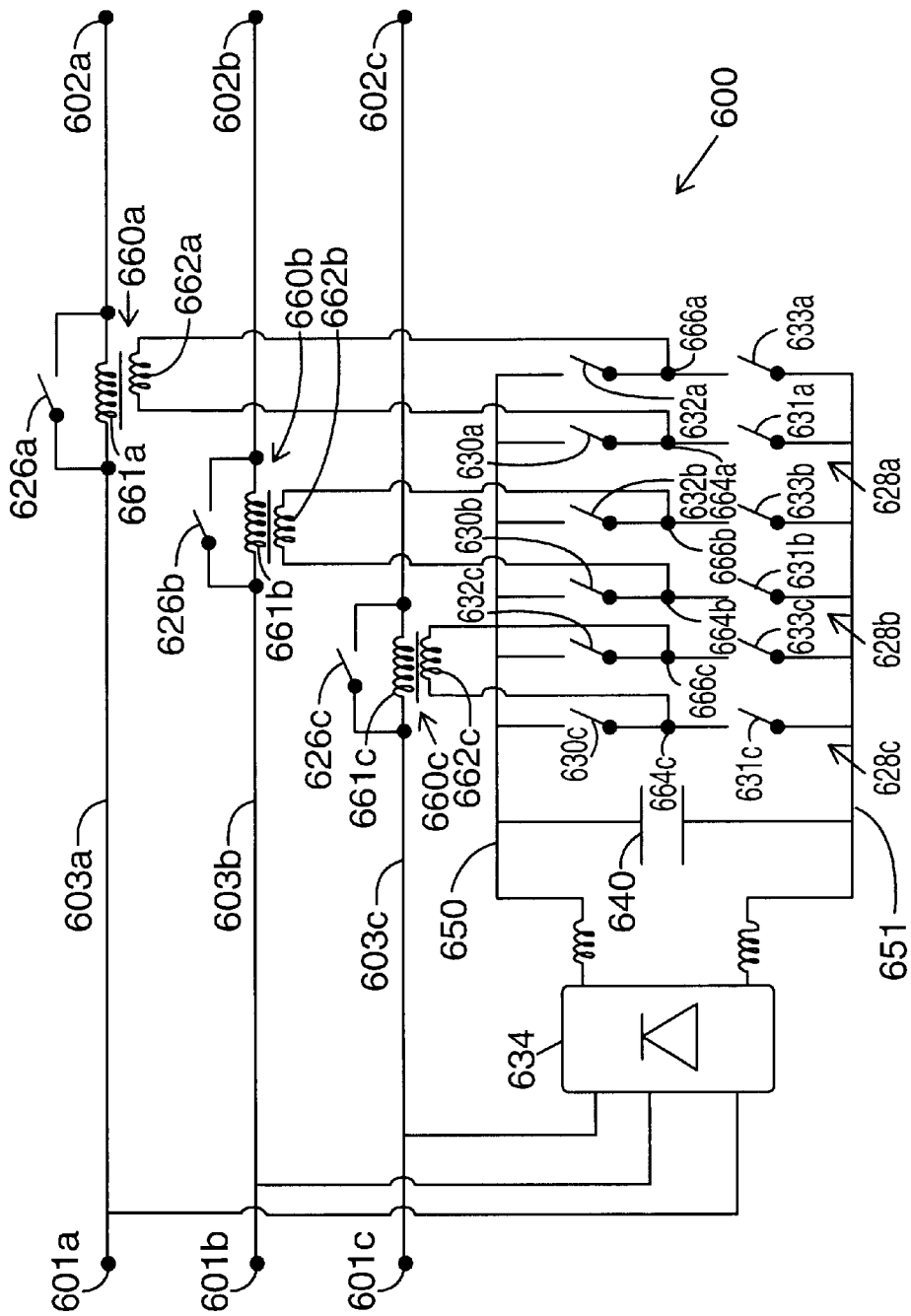
FIG. 8 is a schematic circuit diagram of yet another exemplary three-phase embodiment of a dynamic voltage sag corrector in accordance with the present invention.

A further alternative exemplary embodiment of a multi-phase dynamic voltage sag corrector 600 in accordance with the present invention is illustrated in, and will be described with reference to, FIG. 8. An unprotected three-phase input line voltage signal may be provided on input terminals 601*a–c*. A three-phase output voltage signal is provided on output terminals 602*a–c* to a load. A static bypass switch 626*a–c* is connected between each input terminal 601*a–c* and its corresponding output terminal 602*a–c* on three-phase AC bus lines 603*a–c*. (The static bypass switches 626*a–c* may be implemented using conventional switching devices, in the manner described above.) In accordance with this embodiment of the present invention, a full bridge inverter power conversion circuit 628*a–c* is connected in parallel with each static bypass switch 626*a–c* between the input terminals 601*a–c* and output terminals 602*a–c*. Each full bridge inverter 628*a–c* includes two pair of switching devices 630*a–c*, 631*a–c*, 632*a–c*, and 633*a–c*, wherein the switching devices 630*a–c*, 631*a–c*, and 632*a–c*, 633*a–c* in each pair of switching devices are connected together in series, and each pair of switching devices is connected in parallel between DC bus lines 650 and 651. The full bridge inverter switching devices 630*a–c*, 631 *a–c*, 632*a–c*, and 633*a–c* may be implemented in a conventional manner, as described above, such as using IGBTs or other power-switching devices, with anti-parallel connected diodes. A three-phase rectifier 634 is connected between the three-phase input terminals 601*a–c* and DC bus lines 650 and 651. A storage capacitor 640 is connected across the DC bus lines 650 and 651, in parallel with the full bridge inverters 628*a–c*. The three-phase rectifier 634 rectifies the three-phase input line voltage signal on input terminals 601*a–c* to provide a DC voltage signal on DC bus lines 650 and 651, to thereby charge the storage capacitor 640 to near the peak value of the available input line voltage signal on input terminals 601*a–c*. Each full bridge inverter 628*a–c* is coupled to a corresponding output terminal 602*a–c* such that the inverter switching devices 630*a–c*, 631*a–c*, 632*a–c*, and 633a–c may be controlled, in a conventional manner, to provide a three-phase output voltage signal to the output terminals 602a–c. Each full bridge inverter 628a–c may be coupled in parallel with the corresponding static bypass switch 626a–c using a transformer 660a–c connected in parallel with each static bypass switch 626a–c. One winding 661a–c of each transformer 660a–c is connected between corresponding input terminal 601a–c and output terminal 602a–c. The other winding 662a–c of each transformer 660a–c is connected at one end thereof to a node 664a–c between series connected switching devices 630a–c and 631a–c in a first leg of each full bridge inverter 628a–c, e.g., to the output node 664a–c of the first leg of each inverter 628a–c. The other end of this winding 662a–c is connected at a node 666a–c between inverter switching devices 632a–c and 633a–c in a second leg of each full bridge inverter 628a–c, e.g., at the output node 666a–c of the second leg of each full bridge inverter 628a–c. A low pass filter (not shown in FIG. 8), which may include a series connected inductor and a parallel connected capacitor, is preferably connected between each of the full bridge inverter output nodes 664a–c and 666a–c and the transformer winding 662a–c of each transformer 660a–c, to filter high frequency switching components from the signal provided on the output nodes 664a–c and 666a–c of each full bridge inverter 628a–c, such that the switching devices 630a–c, 631a–c, 632a–c, and 633a–c of the full bridge inverters 628a–c may be controlled, in a conventional manner, to provide a near sinusoidal three-phase output voltage to the transformers 660a–c and, therefore, to output terminals 602a–c.

As described previously, under normal operation conditions, when the three-phase input line voltage signal provided on input terminals 601a–c is at or near a normal voltage level, the static bypass switches 626a–c are closed, and a three-phase power signal is provided directly from the input terminals 601a–c to the output terminals 602a–c via the static bypass switches 626a–c. A system controller (not shown in FIG. 8) monitors the three-phase voltage signal available to the load. If a voltage sag (or surge) condition is indicated, the system controller opens the static bypass switches 626a–c, and controls the switching devices 630a–c, 631a–c, 632a–c, and 633a–c in the full bridge inverters 628a–c to provide a near normal three-phase voltage signal to a load connected to output terminals 602a–c. The control of the switching devices 630a–c, 631a–c, 632a–c, and 633a–c in the full bridge inverters 628a–c to provide a desired three-phase output voltage waveform using PWM modulation techniques is well known in the art. Note that in this manner, the full bridge inverters 628a–c are controlled to provide a desired three-phase output voltage waveform by adding a voltage level on storage capacitor 640 to the available three-phase line voltage level on input terminals 601a–c by injecting voltage signals on AC bus lines 603a–c between input terminals 601a–c and output terminals 602a–c.

The series type dynamic voltage sag correctors described herein provide a desired three-phase output voltage waveform to a load during voltage sag conditions by adding a voltage level in series with the voltage signal provided (e.g., by a utility) on input lines to a load to realize a desired load output signal. One limitation of all such series type voltage regulators is the need for the line voltage to be a low impedance path. In other words, current must be able to continue to flow through the input power lines connecting the utility to the load for power to be injected in series with the input line by the dynamic voltage sag connector. If there is a break in the input line providing power to the dynamic voltage sag corrector and the load, such as an open circuit breaker just upstream from the dynamic voltage sag corrector unit, there is no means of supporting the load via the series dynamic voltage sag corrector. Thus, power to the load can become completely interrupted, causing the load to drop out.

Figure 9:
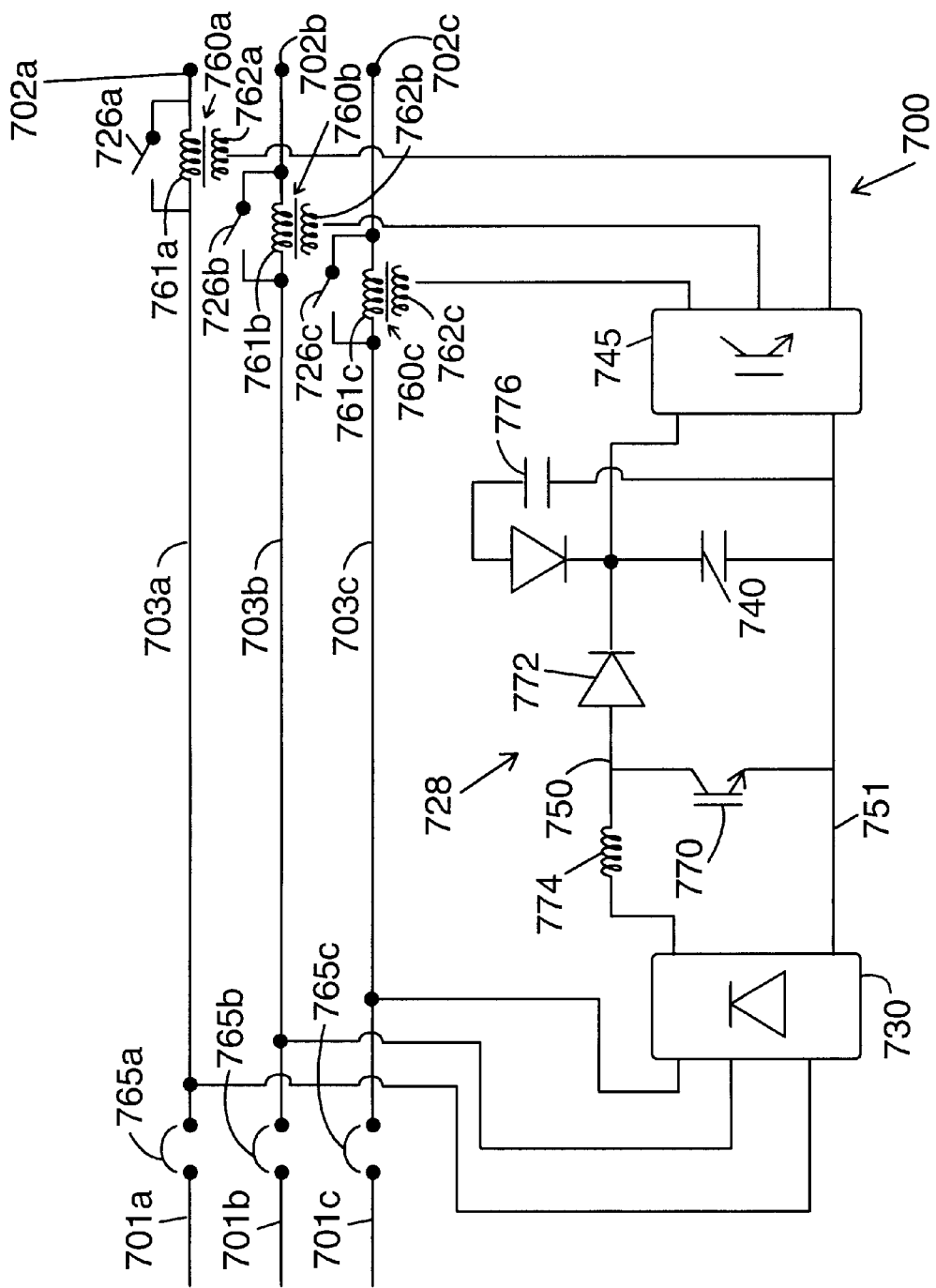
FIG. 9 is a schematic circuit diagram of a generic three-phase embodiment of a dynamic voltage sag corrector in accordance with the present invention for injecting a three-phase power signal in series with three-phase power lines and including an additional switching device and diode for assuring operation during a complete break on the three-phase power lines.

A generic series type multi-phase dynamic voltage sag corrector 700 in accordance with the present invention is illustrated in FIG. 9. A three-phase input line voltage signal is provided, e.g., from a utility, on input lines 701a–c. A three-phase output voltage signal is provided on output terminals 702a–c to a load. A static bypass switch 726a–c is connected between each input line 701a–c and its corresponding output terminal 702a–c on three-phase AC bus lines 703a–c. A three-phase power conversion circuit 728 is connected in parallel with each static bypass switch 726a–c between the input lines 701a–c and output terminals 702a–c. The three-phase power conversion circuit 728 includes a three-phase rectifier 730 connected between the three-phase input lines 701a–c and DC bus lines 750 and 751, a storage capacitor 740 connected across the DC bus lines 750 and 751, and a three-phase inverter 745 connected across the DC bus lines 750 and 751. The three-phase rectifier 730 rectifies the three-phase input line voltage signal on input lines 701a–c to provide a DC voltage signal on DC bus lines 750 and 751, to thereby charge the storage capacitor 740 to near the peak value of the available input line voltage signal on input lines 701a–c. The three-phase inverter 745, which may be implemented, e.g., using a four-leg inverter topology (as illustrated in FIG. 7) or three full bridge inverters (as illustrated in FIG. 8), may be coupled in parallel with the static bypass switches 726a–c using a transformer 760a–c connected in parallel with each static bypass switch 726a–c. One winding 761a–c of each transformer 760a–c is connected between corresponding input lines 701a–c and output terminals 702a–c. The other winding 762a–c of each transformer 760a–c is connected to the three-phase inverter 745, which includes switching devices which are controlled to provide a sinusoidal output voltage signal on each winding 762a–c. (Note that a low pass filter may be connected between the three-phase inverter 745 and the transformer windings 762a–c to filter high-frequency switching noise from the signal provided by the three-phase inverter 745 to the transformer windings 762a–c.)

As discussed above, under normal operating conditions, when the three-phase input line voltage signal provided on input lines 701a–c is at or near a normal voltage level, the static bypass switches 726a–c are closed, and a three-phase power signal is provided directly from the input lines 701a–c to the output terminals 702a–c via the static bypass switches 726a–c. A system controller (not shown in FIG. 9) monitors the three-phase voltage signal available to the load. If a voltage sag (or surge) condition is indicated, the system controller opens the static bypass switches 726a–c and controls the three-phase inverter 745 to provide a near normal three-phase voltage signal to a load connected to output terminal 702a–c. A desired three-phase output voltage wave form is provided to the load by adding a voltage level on storage capacitor 740 to the available three-phase line voltage level on input lines 701a–c by injecting voltage signals on AC bus lines 703a–c in series between the input lines 701a–c and output terminals 702a–c. Even if the input line voltage sags to a relatively low level, e.g., below 50% of the normal input voltage level, the inverter 745 can draw energy from the storage capacitor 740 and inject it through the series transformers 760a–c to support the load, at least for a limited duration. However, if there is a complete break in one of the input lines 701a–c, resulting in a complete interruption of the current provided on the input line 701a–c, the series dynamic voltage sag corrector 700 cannot function to provide power to the output terminals 702a–c. Such a break in the input lines 701a–c may be caused, for example, by the opening of a circuit breaker 765a–c in series with the input lines 701a–c, due to a fault in other loads connected to the input lines 701a–c, or some other fault condition. If the opened circuit breaker 765a–c is just upstream from the dynamic voltage sag corrector 700, it can be seen that there is no path for current flow through the transformer windings 761a–c connected in series with the three-phase bus line 703a–c. In other words, the windings 76la–c are open circuited, and no current can flow through the AC bus lines 703a–c to the output terminals 702a–c even though a voltage signal is provided on transformer windings 762a–c by the three-phase inverter 745. (Unless other loads connected to the input lines 701a–c on the dynamic voltage sag corrector 700 side of the circuit breaker 765a–c represent significantly larger capacitance than the load connected to output terminals 702a–c.)

In accordance with the present invention, a switching device 770 is connected across the DC bus lines 750 and 751 between the rectifier 730 and the storage capacitor 740. The switching device 770 may be implemented in a conventional manner as an IGBT or other power switching device. A diode 772 is connected in a series with one of the DC bus lines 750 between the switching device 770 and the storage capacitor 740. If there is a complete interruption in the input line circuit, such as may be caused by opening of the circuit breaker 765a–c, the switching device 770 is closed. The closed switching device 770 creates an effective short circuit on the input side windings 761a–c of the series transformers 760a–c, thereby creating a current path for current provided through the windings 761a–c to the output terminals 702a–c. (The diode 772 prevents conduction from the storage capacitor 740 back through the switching device 770.) Thus, with the appropriate turns ratio on the transformers 760a–c, a series voltage may be injected onto three-phase bus lines 703a–c by the three-phase inverter 745, via the transformer 760a–c, to maintain a load connected to output terminals 702a–c, until the circuit breakers 765a–c are reclosed. As the circuit breaker 765a–c recloses, input line voltage is restored, and the current through switching device 770 builds up beyond what is required to maintain the load connected to output terminal 702a–c. At this point, switching device 770 may be closed, and normal operation of the dynamic voltage sag corrector 770 is restored. Thus, the switching device 770 and diode 772 in combination allow a series dynamic voltage sag corrector 700 in accordance with the present invention to operate to support a load even if there is a complete break in the input lines 701a–c which normally provide power to the load.

The switching device 770, in combination with an inductor 774, connected between the rectifier 730 and the switching device 770, may also be used as a boost-converter circuit to charge the storage capacitor 740 to a voltage level higher than the available input line voltage level. (Note that the inductor 774 may be provided as an integral part of the multi-phase rectifier circuit 730.) When power is available to the dynamic voltage sag corrector 700 on input lines 701a–c, the switching device 770 may be closed. With switching device 770 closed, current rapidly builds up in inductor 774 as it flows through inductor 774 and switching device 770. When switching device 770 is closed, the energy stored in inductor 774 discharges into the storage capacitor 740 as the current flowing therethrough is redirected through the diode 772 into the storage capacitor 740. In this manner, the switching device 770, in combination with the inductor 774 and diode 772 is operated as a boost converter, which may be employed to charge the storage capacitor 740 to a voltage level higher than the available input line-to-line voltage on input lines 701a–c.

The switching device 770 may also be used to interface an energy storage device 776, such as a ultra-capacitor, to the inverter 745.

Figure 10:
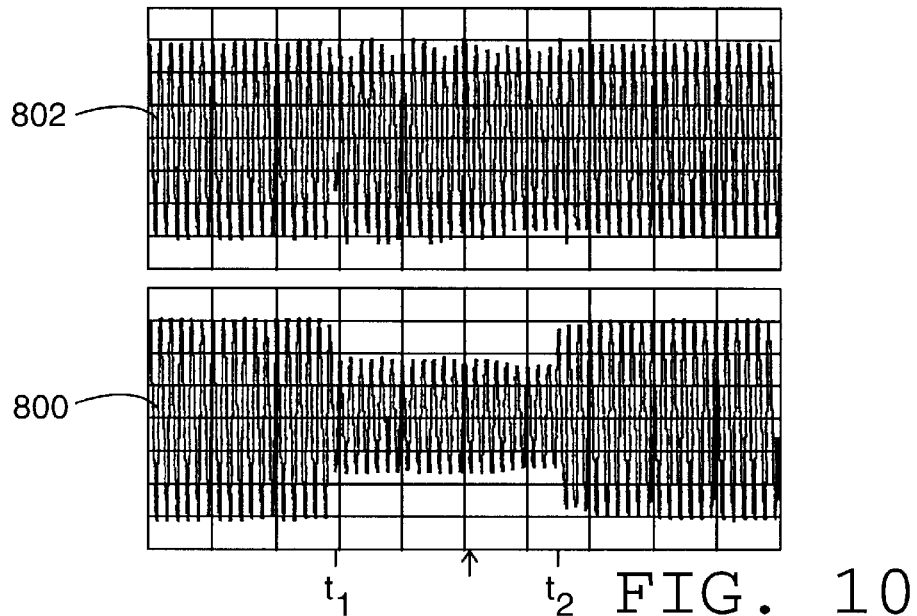
FIG. 10 is a waveform diagram illustrating input and output voltages of a dynamic voltage sag corrector in accordance with the present invention during an input voltage sag condition.

The effectiveness of a dynamic voltage sag corrector in accordance with the present invention for providing voltage sag correction is illustrated by the waveforms 800 and 802 in FIG. 10. Waveform 800 is an exemplary input line voltage waveform applied to the input terminals of a dynamic voltage sag corrector in accordance with the present invention. Waveform 802 is an exemplary output voltage waveform provided on the output terminals of the same dynamic voltage sag corrector. Note that before time $t_1$, the line voltage signal 800 is at a normal voltage level. Under such normal operating conditions, the static bypass switch of a dynamic voltage sag corrector in accordance with the present invention is closed, and the input voltage waveform signal 800 is provided directly to the output terminals of the dynamic voltage sag corrector. Thus, before time $t_1$, the output voltage waveform 802 is identical to the input voltage waveform 800. At time $t_1$, a voltage sag condition occurs in the input voltage waveform 800. As illustrated, the available input voltage drops to a fraction of the nominal input voltage level at time ti. A dynamic voltage sag corrector in accordance with the present invention rapidly detects such a voltage sag condition. In response to the detected voltage sag condition, the static bypass switch of the dynamic voltage sag corrector is opened, and the regulator/storage module is controlled to provide a near-normal output voltage waveform on the voltage sag corrector output terminals. Thus, as illustrated in FIG. 10, following time $t_1$, a near-normal output voltage signal 802 is provided despite the presence of the voltage sag in the input voltage waveform 800. At time $t_2$ the voltage sag condition on the input voltage waveform 800 clears. The system controller in the dynamic voltage sag corrector detects the termination of the voltage sag condition. In response to the termination of the voltage sag condition, the static bypass switch in the dynamic voltage sag corrector is closed once again, to provide the, now normal, input voltage signal 800 directly to the output terminals of the dynamic voltage sag corrector via the static bypass switch. Thus, after time $t_2$, as long as the input voltage waveform 800 is normal, the output voltage waveform 802 corresponds to the input voltage waveform 800. Note that, as described previously, the regulator/storage module of a dynamic voltage sag corrector preferably is controlled to provide an output voltage waveform which is phase synchronized with the available input line voltage waveform 800 when a voltage sag condition occurs. Therefore, disruption of the power signal 802 provided to a load as the dynamic voltage sag corrector responds to the occurrence and termination of a voltage sag condition is prevented.

Figure 11:
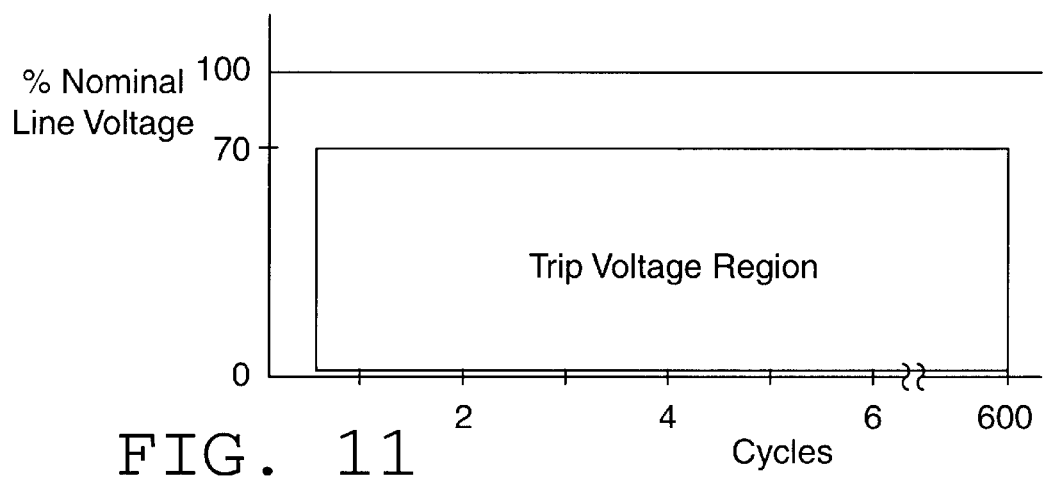
FIGS. 11 and 12 illustrate trip voltage regions for a high intensity discharge light as unprotected by a dynamic voltage sag corrector in accordance with the present invention and as protected by a dynamic voltage sag corrector in accordance with the present invention, respectively.
Figure 12:
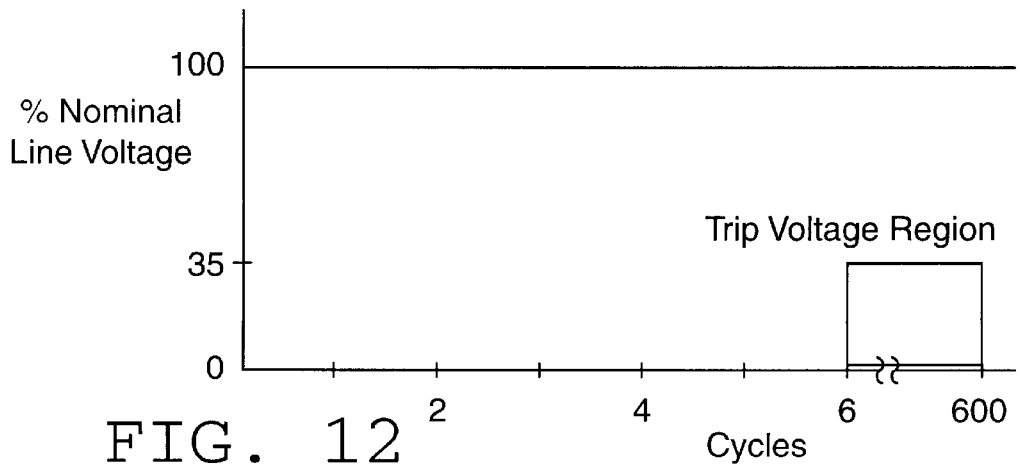

A dynamic voltage sag corrector in accordance with the present invention may be employed in a vast variety of industrial, commercial, and residential applications. An example of one such application is the protection of high intensity discharge (HID) lighting from voltage sag and drop conditions which may cause HID lighting to trip out. Since HID lights require a relatively long time to start up after they are tripped out, even a very brief voltage sag or voltage drop which causes HID lighting to trip out can result in a significant interruption of industrial activity. A dynamic voltage sag corrector in accordance with the present invention will solve 90–95% of the power line quality problems that may cause HID lighting to trip out. For example, FIG. 11 shows the trip voltage region for an HID light that trips out for power interruptions greater than one half cycle and for voltage sags below 70% of nominal. FIG. 12 shows the trip voltage region for the same HID light that is protected by a dynamic voltage sag corrector in accordance with the present invention. For example, as illustrated in FIG. 12, the trip voltage region for an HID light protected by a dynamic voltage sag corrector can be reduced such that the HID light trips out only for power interruptions greater than six cycles and for voltage sags below 35% of nominal. Since the vast majority of power interruptions which are likely to be encountered are shorter than three cycles, and since most voltage sags are not below 45% of nominal, it is seen that a dynamic voltage sag corrector in accordance with the present invention eliminates virtually all power line quality related HID lighting trips. Since a dynamic voltage sag corrector in accordance with the present invention can provide such protection in a very low cost, small size, and light weight package, a dynamic voltage sag corrector can be embodied in a circuit board that can be incorporated into an HID light ballast, or as a retrofit version that is easy to install at a breaker panel to provide protection for entire circuits of HID lights.

The cost, size, and weight advantages of a dynamic voltage sag corrector in accordance with the present invention are achieved by selecting the operating characteristics of the sag corrector to maximize the ability of the corrector to protect the load from the vast majority of voltage surge, sag, and drop conditions which are likely to be encountered and by minimizing the rating of the circuit components which are required to provide such operating characteristics. The circuit components required to provide desired dynamic voltage sag correction operating characteristics are selected based on the thermal rating characteristics of the components. Unlike some other power conversion systems used for voltage sag compensation, such as double conversion uninterruptible power supplies, the inverter switching devices employed in the regulator/storage module of a dynamic voltage sag corrector in accordance with the prevent invention are not in operation most of the time, when normal input power is provided to a load via the static bypass switch. Thus, when a voltage sag condition occurs, requiring operation of the inverter switching devices to provide power to the load, the inverter switching devices are activated from a cold state. Inverter switching devices having a smaller power rating can thus be selected, since switching devices of a given rating can be operated from a cold state for a longer duration than from a warm state. Furthermore, although a dynamic voltage sag corrector in accordance with the present invention may provide compensation for a voltage sag to approximately 50% of the nominal input voltage level continuously, most voltage sags only last for a limited period of time, e.g., 10–20 seconds. With this in mind, the voltage rating of the inverter switching devices employed in the dynamic voltage sag corrector can be reduced further, by limiting the operating time of the inverter to the duration of 90–95% of all voltage sag conditions which will be encountered. Designing the dynamic voltage sag corrector circuit for short-term voltage sags and outages (1–10 seconds) significantly reduces the cost and size of the circuit components which must be employed. Longer term voltage sag and drop events are rare, and typically do not occur continuously.

The operating duration for which a dynamic voltage sag corrector with a given rating can provide correction for a voltage sag or drop condition may be extended when the circuit component temperatures are lower. In accordance with an alternative embodiment of the present invention, the temperatures of selected components in the dynamic voltage sage corrector may be monitored by the system controller. Such temperature monitored components may typically include, for example, the inverter switching devices in the regulator/storage module. If the monitored component temperatures are greater than a selected temperature level, operation of the inverter may be limited to a short duration. Longer operation of the inverter may be allowed if the component temperatures are less than the selected temperature level.

Control of the inverter to take full advantage of the thermal rating of the inverter switching devices selected may also be accomplished by monitoring of the time of operation of the inverter. If the inverter has not been in operation for some time, the inverter switching devices may be assumed to be relatively cool and may thus be operated for a relatively long duration, e.g., five or more seconds, when a voltage sag condition is encountered. However, under extreme conditions, when the inverter is being operated more often, operation of the inverter may be limited to a shorter duration, such as two seconds. This method of controlling the inverter is based on recognition of the fact that most voltage sags will occur rarely, at separated intervals, and for very short durations. Thus, switching devices with lower thermal ratings can be selected, since repeated long duration operation will be rare, and can be protected from damage by limiting operation thereof in such rare cases.

It is understood that the present invention is not limited to the particular embodiments and applications herein illustrated and described, but embraces all modified forms thereof, than the scope of the following claims.

What is claimed is:

1. A dynamic voltage sag corrector, comprising:
   (a) input terminals;
   (b) output terminals;
   (c) a bypass switch connected between the input terminals and the output terminals and responsive to bypass switch control signals to open and close the bypass switch;
   (d) a power conversion and storage module connected in parallel with the bypass switch between the input terminals and the output terminals, wherein the power conversion and storage module includes a rectifier for rectifying power available at the input terminals, an energy storage device for storing the rectified power, and an inverter responsive to inverter control signals to provide an AC signal from energy stored in the energy storage device in parallel with the bypass switch; and
   (e) system controller means for detecting a voltage sag condition when an AC line voltage signal provided to the input terminals drops below a selected low line voltage threshold level, for providing a bypass switch control signal to the bypass switch to open the bypass switch in response to the detection of a voltage sag condition, for providing inverter control signals to the inverter to control the inverter to provide an AC output voltage signal at approximately a pre-voltage sag condition voltage level to the output terminals in response to the detection of the voltage sag condition by adding a voltage level of the storage device to a voltage level of the AC line voltage signal, for detecting a termination of the voltage sag condition when the AC line voltage signal returns to approximately a pre-voltage sag condition voltage level, for terminating the providing of inverter control signals to the inverter in response to the detected termination of the voltage sag condition, and for providing a bypass switch control signal to the bypass switch to close the bypass switch in response to the detected termination of the voltage sag condition.

2. The dynamic voltage sag corrector of claim 1 wherein the bypass switch includes anti-parallel connected thyristors.

3. The dynamic voltage sag corrector of claim 2 wherein the system controller includes means for providing inverter control signals to the inverter to control the inverter to provide a commutation signal to the bypass switch to drive a current through the bypass switch to zero before providing the inverter control signals to the inverter to control the inverter to provide the AC output voltage signal.

4. The dynamic voltage sag corrector of claim 1 wherein the power conversion and storage module includes:
   (i) a pair of rectifying devices connected together at a first node, one rectifying device connected to conduct into the node and the other rectifying device connected to conduct away from the node,
   (ii) a pair of storage capacitors connected together at a second node,
   (iii) a pair of controllable inverter switching devices responsive to the inverter control signals to turn the inverter switching devices on and off connected together at a third node, and
   (iv) a pair of DC bus lines connecting the pairs of rectifying devices, storage capacitors, and inverter switching devices in parallel, wherein the input terminals are connected to the first and second nodes and the output terminals are connected to the first and third nodes such that the bypass switch is connected between the second and third nodes.

5. The dynamic voltage sag corrector of claim 4 wherein the rectifying devices are diodes.

6. The dynamic voltage sag corrector of claim 4 wherein the controllable inverter switching devices include IGBTs with anti-parallel connected diodes.

7. The dynamic voltage sag corrector of claim 4 wherein the means for providing inverter control signals to the inverter includes pulse width modulation means for providing high frequency switching device control signals to the inverter switching devices to control the inverter switching devices to provide an AC output voltage signal at approximately a pre-voltage sag condition voltage level.

8. The dynamic voltage sag corrector of claim 7 comprising additionally a low pass filter connected between the third node and the output terminals to filter high frequency components from the AC output voltage signal.

9. The dynamic voltage sag corrector of claim 1 wherein the system controller means includes a programmable integrated circuit.

10. The dynamic voltage sag corrector of claim 1 wherein the means for detecting a voltage sag condition includes means for monitoring an AC line voltage signal provided to the input terminals.

11. The dynamic voltage sag corrector of claim 8 wherein the means for detecting a voltage sag condition includes means for determining an RMS value of the monitored AC line voltage signal, means for comparing the RMS value of the monitored AC line voltage signal to a low line voltage threshold set point, and means for indicating the detection of a voltage sag condition when the RMS value of the monitored AC line voltage signal is less than the low line voltage threshold set point.

12. The dynamic voltage sag corrector of claim 1 wherein the selected low line voltage threshold level is between approximately 90% and 100% of a nominal AC line voltage signal level.

13. The dynamic voltage sag corrector of claim 1 wherein the means for providing the inverter control signals to the inverter includes means for providing inverter control signals to the inverter to control the inverter to provide an AC output voltage signal between approximately 90% and 100% of a nominal AC line voltage signal level.

14. The dynamic voltage sag corrector of claim 1 wherein the means for detecting the termination of the voltage sag condition includes means for monitoring the AC line voltage signal provided to the input terminals, means for determining an RMS value of the monitored AC line voltage signal, means for comparing the RMS value of the monitored AC line voltage signal to an acceptable line voltage threshold set point, and means for indicating the detection of the termination of the voltage sag condition when the RMS value of the monitored AC line voltage signal exceeds the acceptable line voltage threshold set point.

15. The dynamic voltage sag corrector of claim 14 wherein the acceptable line voltage threshold set point is selected to be higher than the low line voltage threshold level.

16. The dynamic voltage sag corrector of claim 1 wherein the system controller includes means for monitoring a current level on the output terminals before a voltage sag condition is detected, means for comparing the monitored current level with a current overload threshold set point, and means for preventing the providing of the bypass switch control signal to the bypass switch to open the bypass switch and for preventing the providing of inverter control signals to the inverter when the monitored current level exceeds the current overload threshold set point.

17. The dynamic voltage sag corrector of claim 1 wherein the system controller includes means for detecting a voltage surge condition when the AC line voltage signal provided to the input terminals exceeds a selected high line voltage threshold level, for providing a bypass switch control signal to the bypass switch to open the bypass switch in response to the detection of the voltage surge condition, for providing inverter control signals to the inverter switching devices to control the inverter to provide an AC output voltage signal at approximately a pre-voltage surge condition voltage level to the output terminals in response to the detection of the voltage surge condition, for detecting a termination of the voltage surge condition when the AC line voltage signal returns to approximately a pre-voltage surge condition voltage level, for terminating the providing of inverter control signals to the inverter in response to the detected termination of the voltage surge condition, and for providing a bypass switch control signal to the bypass switch to close the bypass switch in response to the detected termination of the voltage surge condition.

18. The dynamic voltage sag corrector of claim 17 wherein the selected high line voltage threshold level is between approximately 100% and 110% of a nominal AC line voltage signal level.

19. The dynamic voltage sag corrector of claim 17 comprising additionally a dissipation circuit connected across the energy storage device, and wherein the system controller includes means for controlling the dissipation circuit to dissipate excess energy stored in the energy storage device following a voltage surge condition.

20. The dynamic voltage sag corrector of claim 18 wherein the dissipation circuit includes a dissipation resistor connected in series with a dissipation circuit switching device, and wherein the means for controlling the dissipation circuit includes means for turning on the dissipation circuit switching device to allow current to flow from the energy storage device through the dissipation resistor to dissipate excess energy stored in the energy storage device in the dissipation resistor.

21. The dynamic voltage sag corrector of claim 1 wherein the system controller includes means for limiting a duration for which inverter control signals may be provided to the inverter to less than a selected maximum operating duration.

22. The dynamic voltage sag corrector of claim 21 wherein the selected maximum operating duration is less than approximately ten seconds.

23. The dynamic voltage sag corrector of claim 21 wherein selected circuit components in the power conversion and storage module are selected such that the rating of the selected circuit components is such that the selected circuit components cannot be operated for longer than the selected maximum operating duration without exceeding the thermal rating of the selected components.

24. The dynamic voltage sag corrector of claim 21 wherein the system controller includes means for monitoring a time of operation of the inverter and means for selecting the maximum operating duration based on the monitored time of operation.

25. The dynamic voltage sag corrector of claim 24 wherein the system controller includes means for selecting a shorter maximum operating duration if the inverter was recently in operation and a longer maximum operating duration if the inverter was not recently in operation.

26. The dynamic voltage sag corrector of claim 1 comprising additionally means for detecting an extreme voltage sag condition when an AC line voltage signal provided to the input terminals drops below a selected extreme low line voltage threshold level lower than the low line voltage threshold level, and means for providing the AC output voltage signal only to a priority portion of a load connected to the output terminals when an extreme voltage sag condition is detected.

27. The dynamic voltage sag corrector of claim 26 wherein the output terminals include a first output terminal connected to an output side of the bypass switch, second and third output terminals connected to an output of the power conversion and storage module, and a load bypass switch responsive to a load bypass switch control signal connected between the first output terminal and the second output terminal, and wherein the system controller includes means for providing the load bypass switch control signal to the load bypass switch when an extreme voltage sag condition is detected to prevent providing of the AC output voltage signal from the power conversion and storage module to the first output terminal when an extreme voltage sag condition is detected.

28. The dynamic voltage sag corrector of claim 1 wherein the power conversion and storage module includes a multi-phase rectifier for rectifying multiphase power available at the input terminals and a multi-phase inverter responsive to the inverter control signals to provide a multi-phase AC signal in parallel with a plurality of bypass switches.

29. The dynamic voltage sag corrector of claim 28 wherein the multi-phase inverter is a four leg three-phase inverter.

30. The dynamic voltage sag corrector of claim 28 wherein the multi-phase inverter includes a plurality of full bridge inverters connected in parallel with the energy storage device.

31. The dynamic voltage sag corrector of claim 28 including a plurality of transformers for connecting each phase output of the multi-phase inverter in parallel with a plurality of bypass switches.

32. The dynamic voltage sag corrector of claim 1 comprising additionally an additional switching device connected in parallel with and between the rectifier and the energy storage device and responsive to an additional switching device control signal and wherein the system controller includes means for providing the additional switching device control signal to close the additional switching device if there is a complete break in the AC line voltage signal provided to the input terminals.

33. The dynamic voltage sag corrector of claim 32 comprising additionally an inductor connected in series between the rectifier and the energy storage device, and wherein the system controller includes means for providing the additional switching device control signals to control the additional switching device as a boost converter to charge the energy storage device to a voltage level higher than the peak-to-peak level of the AC line voltage signal.

34. A method for correcting a voltage sag condition, comprising the steps of:
  (a) connecting an AC load to a source of AC line voltage;
  (b) storing energy from the AC line voltage;
  (c) detecting a voltage sag condition wherein a voltage level of the AC line voltage drops below a selected low line voltage threshold level and detecting a termination of the voltage sag condition; and
  (d) providing an AC output voltage signal to the AC load at approximately a pre-voltage sag condition voltage level by adding the stored energy to the AC line voltage in response to the detection of a voltage sag condition and terminating the providing of the AC output voltage signal to the AC load in response to the termination of the voltage sag condition.

35. The method of claim 34 wherein the step of storing energy from the AC line voltage includes the steps of rectifying the AC line voltage and providing the rectified AC line voltage to a storage capacitor and wherein the step of providing an AC output voltage signal includes the step of controlling an inverter to provide an AC output voltage signal from the energy stored in the storage capacitor.

36. The method of claim 34 wherein the step of detecting a voltage sag condition includes the steps of monitoring the AC line voltage, determining an RMS value of the monitored AC line voltage, comparing the RMS value of the monitored AC line voltage to a low line voltage threshold set point, and indicating the detection of a voltage sag condition when the RMS value of the monitored AC line voltage is less than the low line voltage threshold set point.

37. The method of claim 34 wherein the selected low line voltage threshold level is between approximately 90% and 100% of a nominal AC line voltage signal level.

38. The method of claim 34 wherein the step of providing an AC output voltage signal to the AC load includes the step of providing an AC output voltage signal between approximately 90% and 100% of a nominal AC line voltage signal level.

39. The method of claim 34 wherein the step of detecting the termination of the voltage sag condition includes the steps of monitoring the AC line voltage, determining an RMS value of the monitored AC line voltage, comparing the RMS value of the monitored AC line voltage to an acceptable line voltage threshold set point, and detecting the termination of the voltage sag condition when the RMS value of the monitored AC line voltage exceeds the acceptable line voltage threshold set point.

40. The method of claim 39 wherein the acceptable line voltage threshold set point is selected to be higher than the low line voltage threshold level.

41. The method of claim 34 comprising additionally the steps of:
   (a) detecting a voltage surge condition wherein a voltage level of the AC line voltage exceeds a selected high line voltage threshold level; and
   (b) providing an AC output voltage signal to the AC load at approximately a pre-voltage surge condition voltage level in response to the detection of a voltage surge condition.

42. The method of claim 41 wherein the selected high line voltage threshold level is between approximately 100% and 110% of a nominal AC line voltage signal level.

43. The method of claim 41 comprising the additional step of dissipating excess energy stored from the AC line voltage during the voltage sag condition.

44. The method of claim 34 wherein the step of providing the AC output voltage signal to the AC load is limited to less than a selected maximum operating duration.

45. The method of claim 44 wherein the maximum operating duration is selected to be no more than approximately ten seconds.

46. The method of claim 44 comprising the additional steps of monitoring a time of providing the AC output voltage signal to the AC load and selecting the maximum operating duration based on the monitored time of providing the AC output voltage signal to the AC load.

47. The method of claim 46 wherein the step of selecting the maximum operating duration includes the steps of selecting a shorter maximum operating duration if the AC output voltage signal was recently provided to the AC load and selecting a longer maximum operating duration if the AC voltage signal was not recently provided to the AC load.

48. The method of claim 34 comprising the additional steps of:
   (a) determining if the voltage level of the AC line voltage drops below the selected low line voltage threshold but exceeds a selected extreme voltage sag line voltage threshold;
   (b) providing the AC output voltage signal to an entire load at approximately the pre-voltage sag condition voltage level if the voltage level of the AC line voltage drops below the selected low line voltage threshold but exceeds the selected extreme voltage sag line voltage threshold;
   (c) determining if the voltage level of the AC line voltage drops below both the selected low line voltage threshold and the selected extreme voltage sag line voltage threshold; and
   (d) providing the AC output voltage signal to only a priority portion of the entire load if the voltage level of the AC line voltage drops below both the selected low line voltage threshold and the selected extreme voltage sag line voltage threshold.

49. The method of claim 34 wherein the step of connecting an AC load to a source of AC line voltage includes the step of connecting a multi-phase AC load to a source of multi-phase AC line voltage, and wherein the step of providing an AC output voltage signal to the AC load includes the step of providing a multi-phase AC output voltage signal to the AC load.

50. The method of claim 34 wherein the step of storing energy from the AC line voltage includes the step of boosting a line-to-line voltage of the AC line voltage and storing the energy from the AC line voltage at a boosted voltage level.

51. A dynamic voltage sag corrector, comprising:
   (a) input terminals;
   (b) output terminals;
   (c) a power conversion and storage module connected between the input terminals and the output terminals, wherein the power conversion and storage module includes an energy storage device and an inverter responsive to inverter control signals to provide an AC signal from energy stored in the energy storage device; and
   (d) system controller means for detecting a voltage sag condition when an AC line voltage signal provided to the input terminals drops below a selected low line voltage threshold level, for providing inverter control signals to the inverter to control the inverter to provide an AC output voltage signal at approximately a pre-voltage sag condition voltage level to the output terminals in response to the detection of a voltage sag condition, for detecting a termination of the voltage sag condition when the AC line voltage signal returns to approximately a pre-voltage sag condition voltage level, for terminating the providing of inverter control signals to the inverter in response to the detected termination of the voltage sag condition, and for limiting a duration for which inverter control signals may be provided to less than a selected maximum operating duration.

52. The dynamic voltage sag corrector of claim 51 wherein the selected maximum operating duration is less than approximately ten seconds.

53. The dynamic voltage sag corrector of claim 51 wherein selected circuit components in the power conversion and storage module are selected such that the rating of the selected circuit components is such that the selected circuit components cannot be operated for longer than the selected maximum operating duration without exceeding the thermal rating of the selected components.

54. The dynamic voltage sag corrector of claim 51 wherein the system controller includes means for monitoring a time of operation of the inverter and means for selecting the maximum operating duration based on the monitored time of operation.

55. The dynamic voltage sag corrector of claim 54 wherein the system controller includes means for selecting a shorter maximum operating duration if the inverter was recently in operation and a longer maximum operating duration if the inverter was not recently in operation.

56. A method for correcting a voltage sag condition, comprising the steps of:
   (a) connecting an AC load to a source of AC line voltage;
   (b) detecting a voltage sag condition wherein a voltage level of the AC line voltage drops below a selected low line voltage threshold level and detecting a termination of the voltage sag condition;
   (c) controlling an inverter to provide an AC output voltage signal to the AC load at approximately a pre-voltage sag condition voltage level in response to the detection of a voltage sag condition and terminating the providing of the AC output voltage signal to the AC load in response to the termination of the voltage sag condition; and
   (d) limiting the controlling of the inverter to provide the AC output voltage signal to less than a selected maximum operating duration.

57. The method of claim 56 wherein the maximum operating duration is selected to be no more than approximately ten seconds.

58. The method of claim 56 comprising the additional steps of monitoring a time of controlling the inverter to provide the AC output voltage signal to the AC load and selecting the maximum operating duration based on the monitored time of controlling the inverter to provide the AC output voltage signal to the AC load.

59. The method of claim 56 wherein the step of selecting the maximum operating duration includes the steps of selecting a shorter maximum operating duration if the inverter was recently controlled to provide the AC output voltage signal to the AC load and selecting a longer maximum operating duration if the inverter was not recently controlled to provide the AC output voltage signal to the AC load.

60. The method of claim 56 comprising the additional step of selecting components of the inverter such that a rating of the selected circuit components is such that the selected circuit components cannot be operated for longer than the selected maximum operating duration without exceeding the thermal rating of the selected components.

61. A dynamic voltage sag corrector, comprising:

(a) input terminals;

(b) output terminals;

(c) a power conversion and storage module connected to provide an AC signal in series between the input terminals and the output terminals, wherein the power conversion and storage module includes a rectifier connected to the input terminals for rectifying power available at the input terminals, an energy storage device for storing the rectified power, and an inverter responsive to inverter control signals to provide an AC signal from energy stored in the energy storage device in series between the input terminals and the output terminals;

(d) an additional switching device connected in parallel with and between the rectifier and the storage device and responsive to an additional switching device control signal; and (e) a system controller means for providing inverter control signals to control the inverter to provide an AC output voltage signal to the output terminals and for providing the additional switching device control signal to close the additional switching device if there is a break in an AC line voltage signal provided to the input terminals.

62. The dynamic voltage sag corrector of claim 61 wherein the power conversion and storage module includes a multi-phase rectifier for rectifying multi-phase power available at the input terminals and a multi-phase inverter responsive to the inverter control signals to provide a multi-phase AC signal in series between the input lines and the output lines.

63. The dynamic voltage sag corrector of claim 61 comprising additionally an inductor connected in series between the rectifier and the energy storage device, and wherein the system controller includes means for providing the additional switching device control signals to control the additional switching device as a boost converter to charge the energy storage device to a voltage level higher than the peak-to-peak level of the AC line voltage signal.

64. The dynamic voltage sag corrector of claim 61 comprising additionally a transformer connected to couple the inverter in series between the input terminals and the output terminals.

* * * * *